US010362612B2

(12) United States Patent
Valicherla et al.

(10) Patent No.: US 10,362,612 B2
(45) Date of Patent: Jul. 23, 2019

(54) VIRTUAL PRIVATE NETWORKING BASED ON PEER-TO-PEER COMMUNICATION

(71) Applicant: Citrix Systems, Inc., Fort Lauderdale, FL (US)

(72) Inventors: Chakravarthi Valicherla, Coral Springs, FL (US); Grant Kennell, Lauderhill, FL (US); Jaspreet Singh, Pompano Beach, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 24 days.

(21) Appl. No.: 15/450,654

(22) Filed: Mar. 6, 2017

(65) Prior Publication Data
US 2018/0255591 A1    Sep. 6, 2018

(51) Int. Cl.
| H04L 12/46 | (2006.01) |
| H04L 29/06 | (2006.01) |
| H04W 4/00 | (2018.01) |
| H04W 76/14 | (2018.01) |
| H04W 84/18 | (2009.01) |
| H04W 4/80 | (2018.01) |

(Continued)

(52) U.S. Cl.
CPC ........ H04W 76/14 (2018.02); H04L 12/4633 (2013.01); H04L 12/4641 (2013.01); H04L 63/0272 (2013.01); H04L 69/03 (2013.01); H04W 4/80 (2018.02); H04W 12/02 (2013.01); H04W 84/18 (2013.01); *H04L 63/0815* (2013.01); *H04W 88/04* (2013.01); *H04W 88/06* (2013.01)

(58) Field of Classification Search
None
See application file for complete search history.

(56) References Cited

U.S. PATENT DOCUMENTS

| 2008/0192713 | A1* | 8/2008 | Mighani | ............... H04W 84/00 370/338 |
| 2008/0307519 | A1* | 12/2008 | Curcio | ................ H04L 63/0227 726/15 |

(Continued)

OTHER PUBLICATIONS

May 4, 2018—(WO) ISR and Written Opinion—App PCT/US2018/020121.

(Continued)

*Primary Examiner* — Kevin C. Harper
*Assistant Examiner* — Derrick V Rose
(74) *Attorney, Agent, or Firm* — Banner & Witcoff, Ltd.

(57) ABSTRACT

Methods and systems for enabling multiple mobile devices to access an access gateway when at least one of the multiple mobile devices is unable to establish a virtual private network connection with the access gateway are described herein. For example, in some embodiments, a mobile device may configure itself as a member of a mesh network. A virtual private network connection may be established between the mobile device and the access gateway. The mesh network may include one or more other member devices that are unable to establish a virtual private network with the access gateway. After completing its configuration, the mobile device may receive, over a peer-to-peer connection of the mesh network, data that is intended for the access gateway and that is from one of the other member devices. The mobile device may transmit the data to the access gateway via the virtual private network connection.

20 Claims, 16 Drawing Sheets

(51) Int. Cl.
*H04W 12/02* (2009.01)
*H04W 88/04* (2009.01)
*H04W 88/06* (2009.01)

(56) References Cited

U.S. PATENT DOCUMENTS

| | | | |
|---|---|---|---|
| 2011/0283347 A1 | 11/2011 | Bhuta et al. | |
| 2013/0145006 A1* | 6/2013 | Tammam | G06F 9/5027 709/223 |
| 2014/0068750 A1 | 3/2014 | Tjahjono et al. | |
| 2014/0250204 A1 | 9/2014 | Shalunov et al. | |
| 2014/0298420 A1* | 10/2014 | Barton | H04L 63/10 726/4 |
| 2015/0245182 A1* | 8/2015 | Scagnol | H04L 43/065 370/312 |

OTHER PUBLICATIONS

"Bluetooth—Wikipedia", Mar. 5, 2017, XP055470267, retrieved from URL:Https://en.wikipedia.org/w/index.php?title=bluetooth&oldid=768754168#pairing_and_bonding [retrieved on Apr. 25, 2018], p. 17, 27 pages.

* cited by examiner ic # VIRTUAL PRIVATE NETWORKING BASED ON PEER-TO-PEER COMMUNICATION

FIELD

Aspects described herein generally relate to virtual private networking, peer-to-peer communication, mesh networking, and/or enterprise mobility management systems.

BACKGROUND

Users today often use multiple computing devices. For example, a user may use a smart phone, a tablet computer and a laptop computer at different times throughout the day. As a user integrates a greater number of devices into his or her daily life, the user may have a growing desire to use those devices to access and use resources of his or her employer (or some other enterprise) from a remote location. These devices may have different capabilities and, depending on the operating environment of the remote location, may be unable to connect to the same networks. For example, the user's smart phone may be connected to a cellular network, but the user's tablet or laptop computer may be unable to connect to the cellular network. If an enterprise wants to allow a user to access an enterprise resource from both the smart phone and the laptop in such an operating environment, the enterprise may face a number of challenges. For example, if the cellular network is the only network available to the user, it is a challenge to enable the ability for the user to access the enterprise resource from the tablet or laptop computer. Moreover, even if the user is able to access the enterprise resource from the tablet or laptop computer, it is a challenge to ensure that the user's access remains secure. In view of these challenges, there is a need to improve a user's ability to access enterprise resources from multiple devices in a secure manner.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are, for example, directed towards enabling multiple mobile devices to access an access gateway when at least one of the multiple mobile devices is unable to establish a virtual private network connection with the access gateway.

For example, in some embodiments, at least two mobile devices (e.g., a first mobile device and a second mobile device) may be within a threshold distance from each other than enables the devices to communicate using a peer-to-peer connection. Additionally each device may be configured to implement an enterprise management framework that, for example, controls how particular managed applications execute on the mobile device and/or manages the establishment of a virtual private network connection with an access gateway. The first mobile device may be able to establish a virtual private network connection with the access gateway. The second mobile device, however, may be unable to establish its own virtual private network connection with the access gateway. Accordingly, in view of the above, the second mobile device may be able to communicate with the access gateway based on the first and second mobile device becoming members in a mesh network that uses the peer-to-peer connection and further based on the virtual private network connection that is established between the first mobile device and the access gateway.

Indeed, in some embodiments, the first mobile device may configure itself as a member of a mesh network. After completing its configuration, the first mobile device may be able to communicate with the second mobile device over the mesh network via the peer-to-peer connection. The first mobile device may receive, via the peer-to-peer connection and from the second mobile device, data that is intended for the access gateway. The first mobile device may transmit the data to the access gateway via the virtual private network connection.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
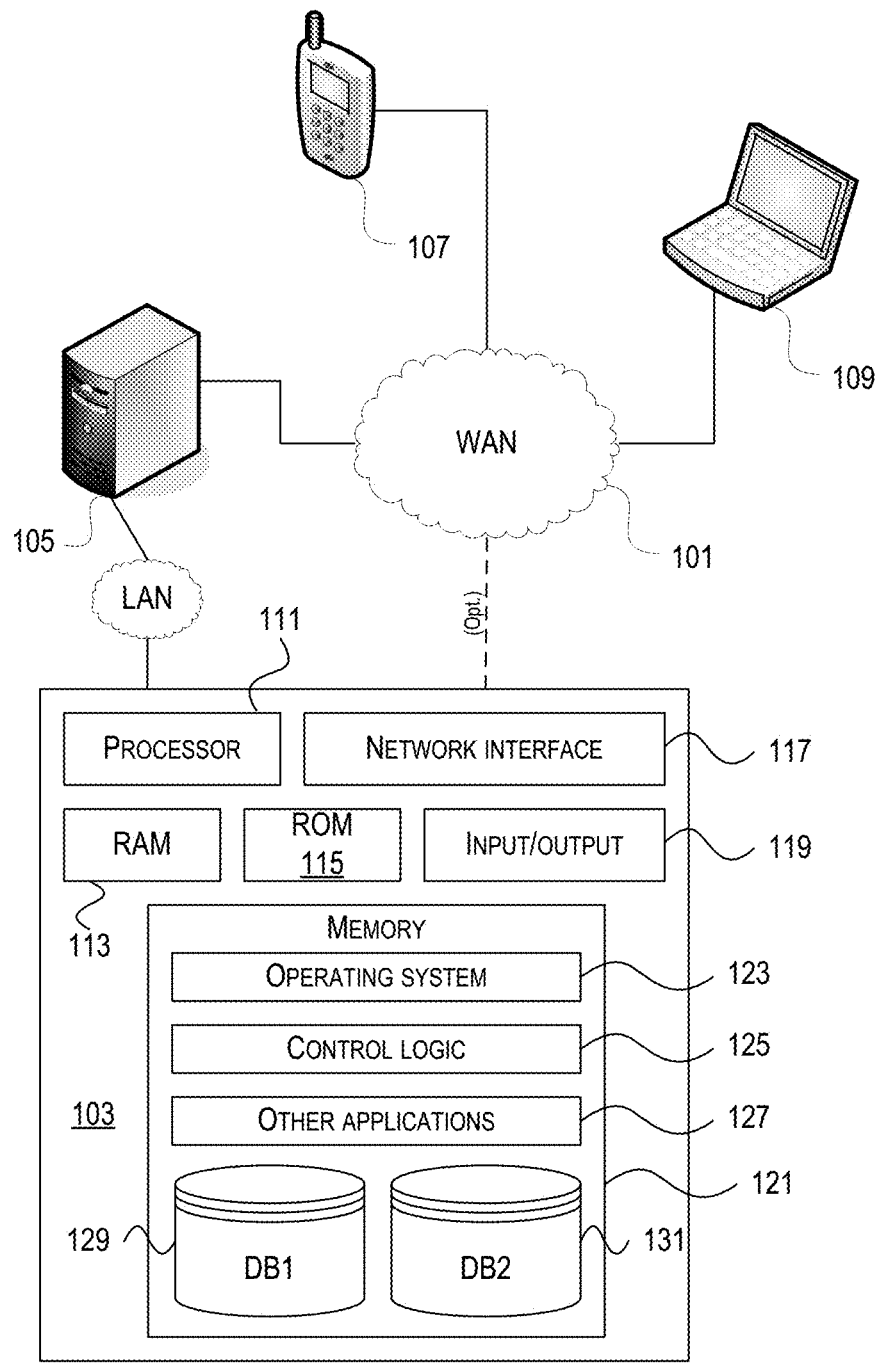
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
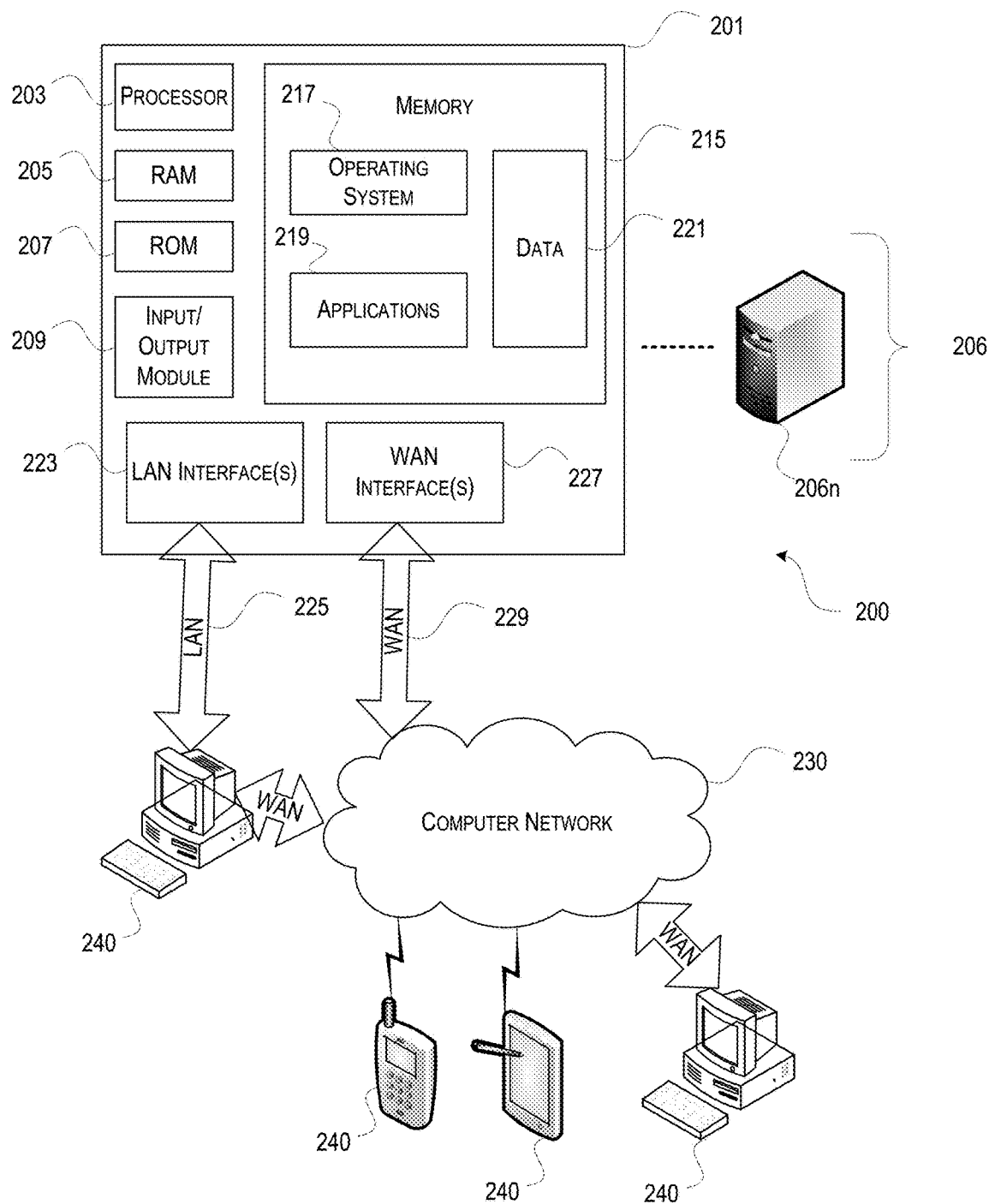
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
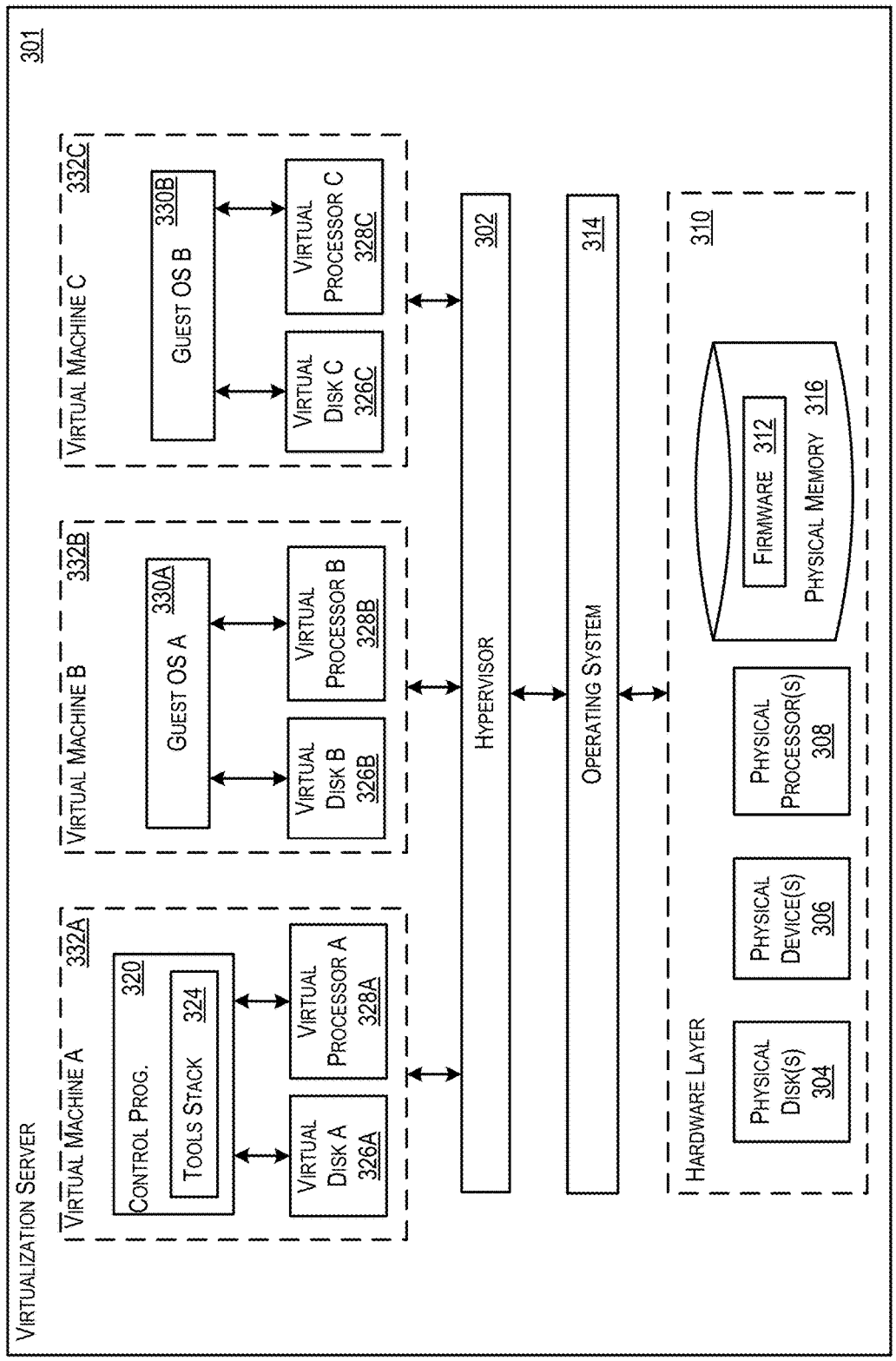
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
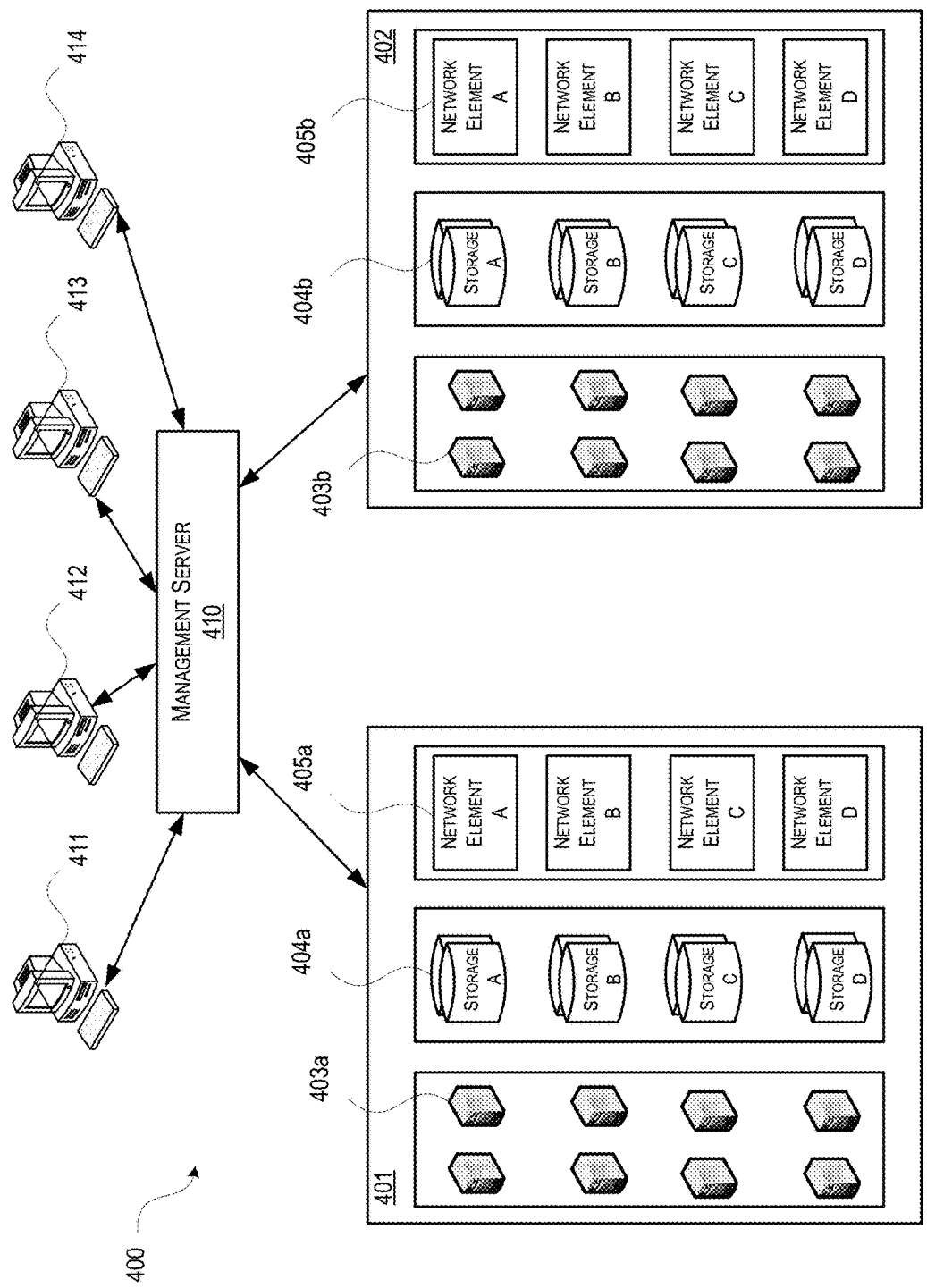
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network resources 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
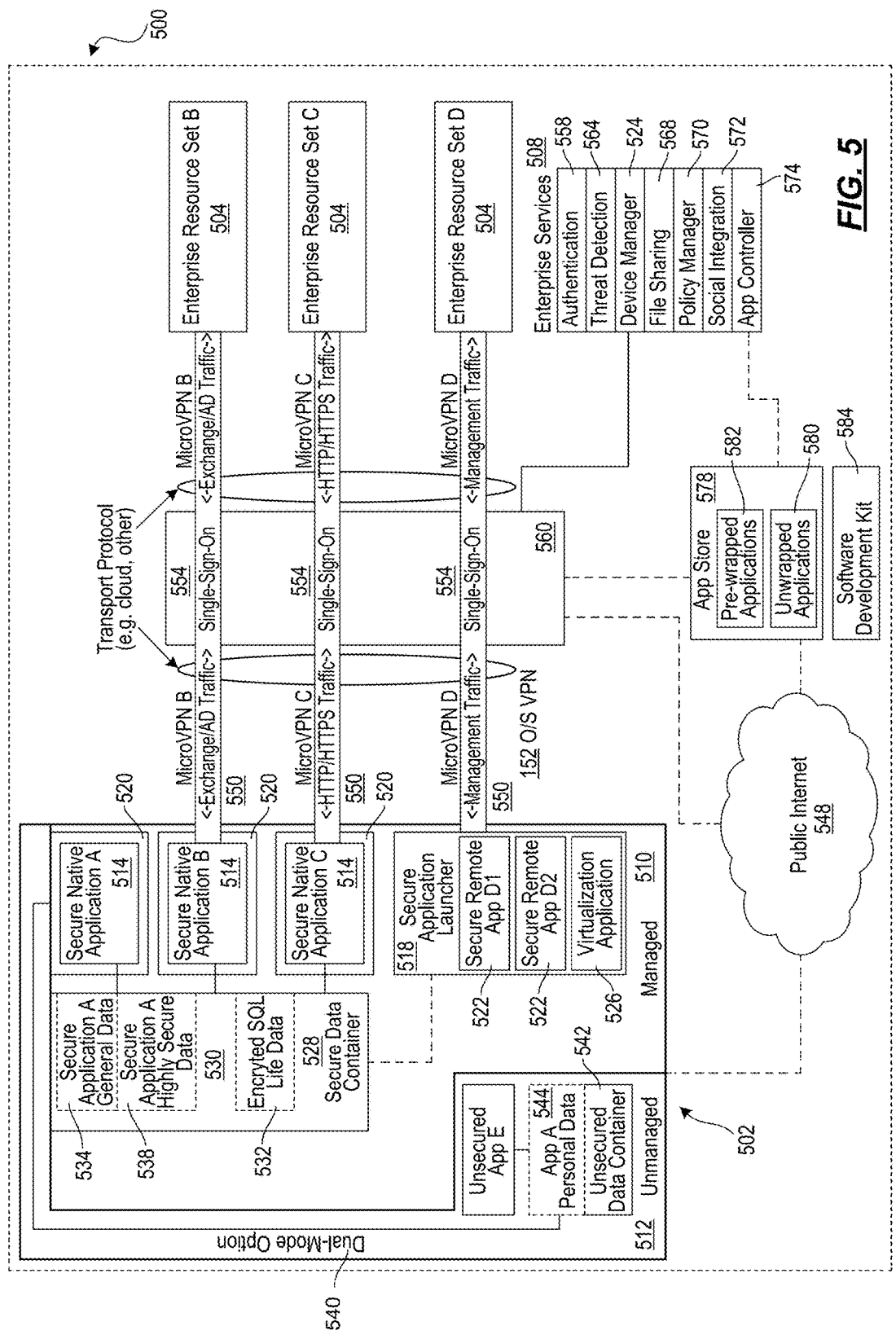
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is impenetrable by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications 550, particular devices, particular secured areas on the mobile device 552, and the like. For example, each of the wrapped applications in the secured area of the mobile device 502 may access enterprise resources through an application-specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
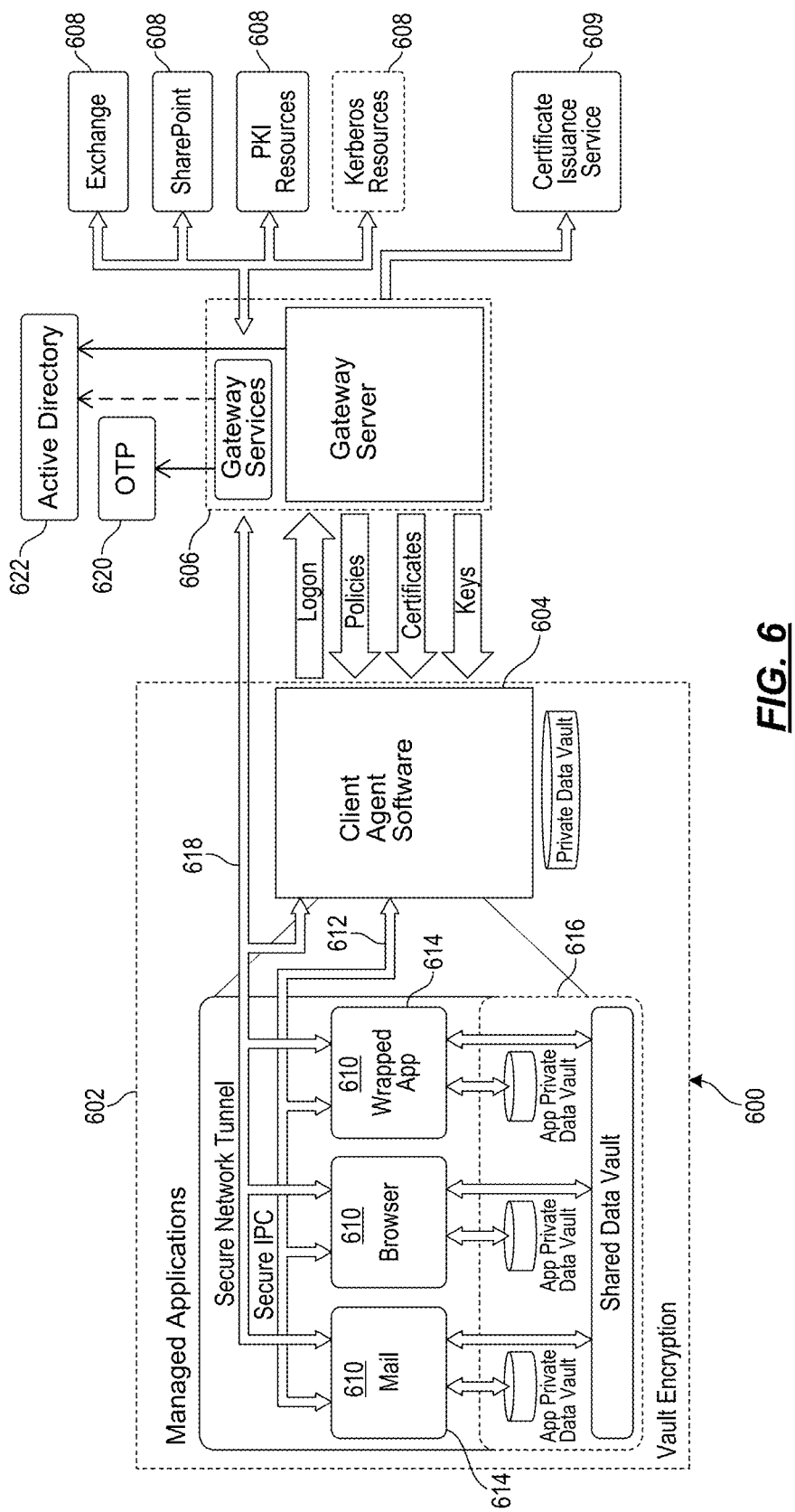
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, SharePoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) of the gateway server 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (also known as NETSCALER ACCESS GATEWAY). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Enterprise Mobility Management Architecture and Peer-to-Peer Communication

As discussed above, a mobile device, if configured with aspects of an enterprise mobility technical architecture and/or an enterprise mobility management system, may enable the ability for a user to access enterprise resources, enterprise services and the like. The access may be based on a number of virtual private network connections established with and managed by an access gateway. Often, the user may have multiple devices and, upon each being configured with aspects of the enterprise mobility technical architecture and/or the enterprise mobility management system, each of the devices may enable the ability for the user to access the enterprise resources, the enterprise services, and any other service/resource accessible via the access gateway. Each of these devices (e.g., a tablet, mobile phone, other computing device) may have different capabilities and these capabilities may change the way in which the user is able to use each device to access the resources and services via the access gateway.

For example, one device may be a mobile phone that is connected to a wireless network (e.g., a third generation (3G) wireless network, a fourth generation (4G) wireless network, a Long-Term Evolution (LTE) wireless network, a WI-FI wireless local area network) and, via the connection to the wireless network, the mobile phone may be able to establish a virtual private network connection to the access gateway. A second device may be a tablet computer that does not have a connection to a wireless network or is otherwise unable to establish a virtual private network connection to the access gateway. The inability for the tablet computer to establish a virtual private network connection to the access gateway diminishes the user's ability to use the enterprise mobility management system to its full potential. Accordingly, the user's experience with the enterprise mobility management system may be improved if the user had the ability to use both devices to access the resources and services via the access gateway, despite the differences in each devices' network connectivity. These benefits, and others, will be apparent in view of the below discussion and this disclosure as a whole. In particular, FIGS. 7 through 12 and the corresponding description provide examples that enable and use multiple devices to, among other things, access enterprise resources and enterprise services via an access gateway.

Figure 7:
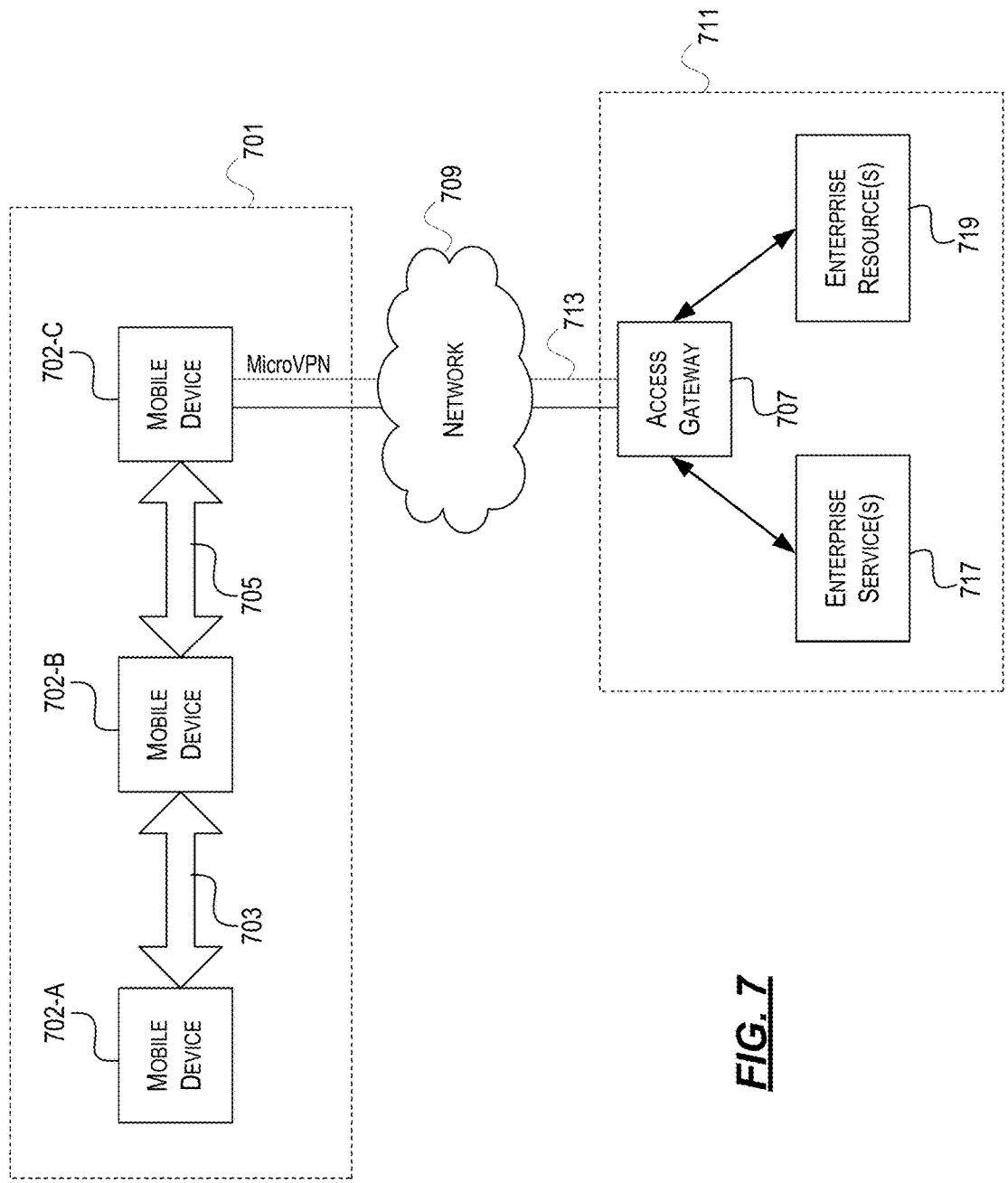
FIG. 7 illustrates one example arrangement in which a user may be able to access enterprise resources and enterprise services using multiple devices in accordance with various aspects described herein.

FIG. 7 illustrates one example arrangement in which a user may be able to access enterprise resources and enterprise services using multiple devices in accordance with various aspects described herein. The example arrangements includes three mobile devices 702-A, 702-B, and 702-C. The three mobile devices are depicted as being located in a first location 701 (e.g., a single home or premises, an automobile, within a threshold distance from each other, at a geographic area of a particular size, location serviced by the same cellular tower, etc.). Each device may be configured with aspects of the enterprise mobility technical architecture described in connection with FIG. 5 (e.g., configured similar to mobile device 502) and/or the enterprise mobility management system described in connection with FIG. 6 (e.g., configured similar to mobile device 602). Each of the three mobile devices 702-A, 702-B and 702-C may be associated with the same user (not shown). The number of mobile devices depicted in FIG. 7 is for illustrative purposes. The user could be associated with more or less mobile devices and the methods described herein apply to arrangements with a different number of mobile devices.

The user may intend to use each of the three mobile devices 702-A, 702-B and 702-C to access and use various enterprise resources 719 and/or enterprise services 717. Access to and use of the enterprise resources 719 and the enterprise services 717 may be managed via access gateway 707. The access gateway 707, enterprise resources 719 and/or enterprise services 717 are depicted as being located at a second location 711, which is different or remote from the first location 701. The second location 711 is shown for simplicity. In some arrangements, the enterprise resources 719, the enterprise services 719 and the access gateway 707 may be located at different locations from each other. The access gateway 707 may be configured with aspects of the enterprise mobility technical architecture described in connection with FIG. 5 (e.g., configured similar to access gateway 560) and/or may be configured with aspects of the enterprise mobility management system described in connection with FIG. 6 (e.g., configured similar to gateway server 606). The enterprise resources 719 and the enterprise resources may be similar to those discussed in connection with FIG. 5 and FIG. 6 (e.g., enterprise resources 504, enterprise services 508, enterprise resources/services 608, 609, 620, 622, and the like). The access gateway 707 may also provide functionality in addition to the enterprise resources 719 and the enterprise services 717 including, for example, access to the public Internet 548, an app store 578, and the like.

Each of the three mobile devices 702-A, 702-B and 702-C may have capabilities different from each other and, based on the networks available at the first location 701, certain devices may be unable to establish a virtual private network connection to the access gateway 707. As depicted in FIG. 7, mobile device 702-C has established a virtual private network connection 713 with the access gateway 707. As also depicted in FIG. 7, mobile devices 702-A and 702-B do not have a virtual private network connection established with the access gateway 707. For example, mobile device 702-C may be a device capable of connecting to a wireless network 709 (e.g., 3G wireless network, 4G wireless network, LTE wireless network, WI-FI wireless local area network, and the like) that enables mobile device 702-C to communicate with the access gateway 707. Mobile devices 702-A and 702-B may each be devices that are incapable of connecting to the wireless network 709 (e.g., a tablet computer without the capability of connecting to a 3G, 4G or LTE wireless network) or may be devices in which the user has chosen to not connect to the wireless network 709 (e.g., a device with a disabled wireless radio such as a device set in an airplane mode).

The virtual private network connection 713 may be one or more microVPN connections or application-specific VPN connections similar to those discussed in connection with FIGS. 5 and 6. In such arrangements, the virtual private network connection 713 may allow for the exchange of data traffic between the access gateway 707 and various components of the mobility management system of the mobile device 702-C including, for example, one or more managed applications of the mobile device 702-C (e g, managed application 514) and/or a client agent of the mobile device 702-C (e.g., client agent 604). The virtual private network connection 713 may act as a tunnel through the wireless network 709 (and one or more other networks not explicitly shown in FIG. 7). Some examples of the types of managed applications/client agents suitable for exchanging data over the virtual private network connection 713 include, for example, the WORX suite of applications by Citrix System, Inc. (e.g., WORX HOME by Citrix Systems, Inc.; and WORXMAIL by Citrix Systems, Inc., etc.) and other applications/client agents compatible with XENMOBILE by Citrix Systems, Inc.

The three mobile devices 702-A, 702-B and 702-C may be configured as members (or nodes) of a mesh network. A mesh network is generally a network in which members relay data to other members of the mesh network. Each member may relay data using, for example, a flooding technique or a routing technique. While routing techniques could be used, for clarity and ease of discussion, this disclosure will provide examples of a mesh network that uses a routing technique. Under a routing technique, data may be routed throughout the mesh network as a series of hops, from member to member, until it reaches its final destination. Accordingly, as depicted in FIG. 7, the mobile devices 702-A, 702-B and 702-C are members of a mesh network and data may be routed throughout the mesh network via peer-to-peer connections 703 and 705. The peer-to-peer connections 703 and 705 may employ various transport protocols including, for example, a BLUETOOTH protocol, a WI-FI DIRECT protocol, or any other protocol that allows direct communication between devices in close physical proximity. Peer-to-peer connection 703 may also use a different transport protocol than peer-to-peer connection 705. For example, peer-to-peer connection 703 may use a BLUETOOTH protocol and peer-to-peer connection 705 may use a WI-FI DIRECT protocol.

In some arrangements, the peer-to-peer connection is configured to use a particular encryption scheme so that data transmitted over the peer-to-peer connection is encrypted. Each peer-to-peer connection may use its own encryption scheme (e.g., data transmitted via peer-to-peer connection 703 is encrypted using encryption keys different from the key used to transmit data via peer-to-peer connection 705); each type of peer-to-peer connection may use its own encryption scheme (e.g., data transmitted via BLUETOOTH connections is encrypted using an encryption key different from the key used to encrypt data transmitted via WI-FI DIRECT connections); or the mesh network may use a single, common, encryption scheme (e.g., the same encryption/decryption keys are used to encrypt/decrypt data transmitted via each peer-to-peer connection). The encryption scheme may be specified in a policy enforced by the enterprise management framework. Moreover, the encryption scheme may be the same as what is used for storing data into a secure container or secure data vault (e.g., the encryption/decryption keys used to encrypt/decrypt data stored in secure container 528 and/or data vault 616 may be used to for encrypting/decrypting data transmitted via a peer-to-peer connection).

Further, there may be additional peer-to-peer connections between the mobile devices 702-A, 702-B and 702-C. For example, a peer-to-peer connection (not shown) may be established between mobile device 702-A and mobile device 702-C. As another example, a second peer-to-peer connection (not shown) may be established between mobile device 702-A and mobile device 702-B in addition to the illustrated peer-to-peer connection 705. The use of a mesh network is for illustrative purposes. Other types of ad-hoc networks or peer-to-peer networks could be used in various embodiments that incorporate aspects described herein. An example method that may be used by each mobile device 702-A, 702-B and 702-C to become a member of the mesh network will be discussed below in connection with FIG. 8. Further details related to establishing a mesh network will be discussed in connection with FIG. 12.

The depicted arrangement may enable data from the mobile devices 702-A and 702-B to be received by the access gateway 707. In this way, mobile device 702-A and 702-B may be able to access and/or use functionality controlled and/or managed by the access gateway 707 including the enterprise resources 719 and the enterprise services 717. For example, data intended for the access gateway 707 (e.g., data generated by a managed application or client agent of mobile device 702-A and 702-B) may be routed and transmitted, via the one or more peer-to-peer connections 703 and/or 705 of the mesh network, to mobile device 702-C. Once received by mobile device 702-C, the data may be transmitted, via the virtual private network connection 713, to the access gateway 707. Similarly, the access gateway 707 may transmit data intended for mobile device 702-A or 702-B (e.g., data generated based on an access of the enterprise resources 719 or the enterprise services 717), via the virtual private network connection 713, to mobile device 702-C. Once received by mobile device 702-C, the data may be routed and transmitted, via the one or more peer-to-peer connections 703 and/or 705 of the mesh network, to the intended destination. Upon receipt, mobile device 702-A or 702-B may process the data in accordance with the application management framework (e.g., provide the data to a managed application, store the data in a container, etc.). For example, a managed mail application of mobile device 702-B may receive email data via the access gateway 707 to allow the user to receive new emails using the virtual private network connection 713. As another example, a managed browser application of mobile device 702-A may be able to receive web browsing data form the access gateway to allow the user to browse the Internet from the mobile device 702-A using the virtual private network connection 713. Additionally, the mesh network may be used to transmit data between the mobile devices 702-A, 702-B and 702-C, which may allow for the mobile devices to perform various functions related to the application management framework. For example, screen sharing data may be transmitted among the mobile devices 702-A, 702-B and 702-C to allow the user to share a screen from one of the devices. As another example, email data may be transmitted among the mobile devices 702-A, 702-B and 702-C to allow the user to sync email messages among the mobile devices 702-A, 702-B and 702-C. Further details as to how a mesh network may be used in connection with an enterprise mobility management system will be discussed in connection with FIGS. 11A-11D and FIG. 12.

Figure 8:
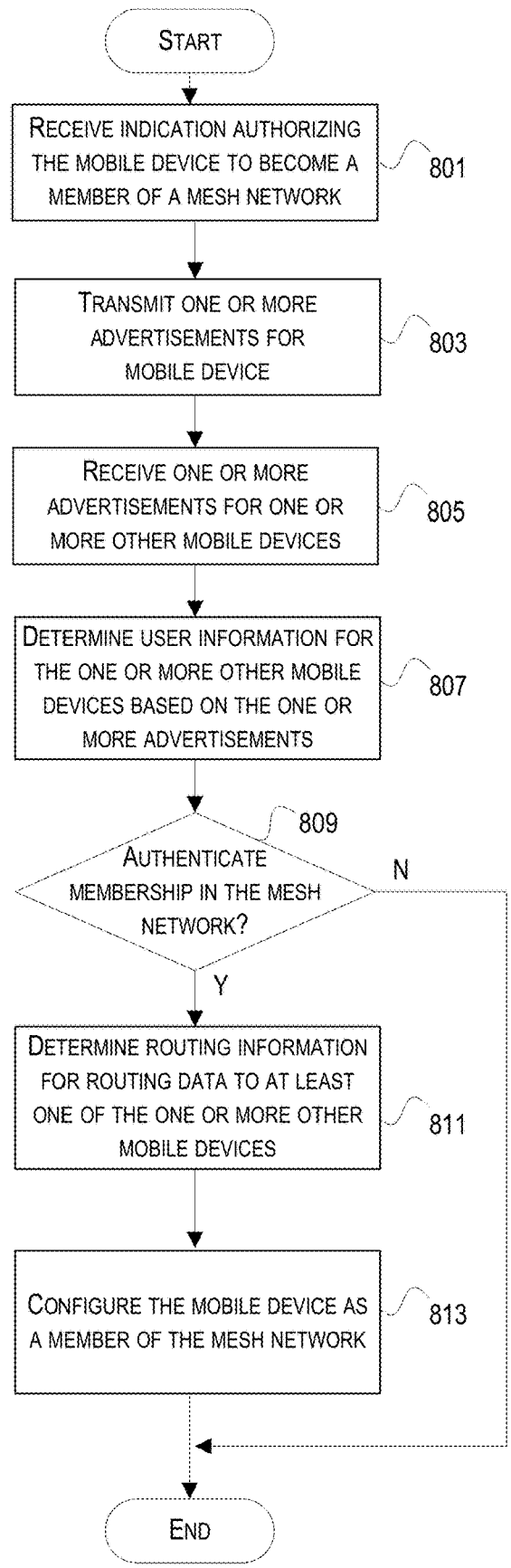
FIG. 8 illustrates an example method that may be used in connection with establishing a mesh network.

FIG. 8 illustrates an example method that may be used in connection with establishing a mesh network. In particular, the example method of FIG. 8 may be used by each of the mobile devices 702-A, 702-B and 702-C from FIG. 7 to become members in or otherwise establish a mesh network. In some arrangements, the steps of FIG. 8 may be performed by one or more components of the enterprise mobility management system including, for example, the client agent 604 of FIG. 6. Additionally, the mobile device may, to facilitate the establishment of the mesh network, use a variation on an existing technology such as the OPENGARDEN SDK to assist in advertising the presence of the mobile device and the discovery of nearby devices.

At step 801, the mobile device may receive an indication that authorizes the mobile device to join a mesh network. In some arrangements, the indication may be received based on a user's interaction with the mobile device that initiates or otherwise causes the mobile device to attempt to establish a mesh network. For example, the user of the mobile device may authorize membership in a mesh network by toggling a mesh network setting stored on a managed partition of the mobile device. As another example, the user may be able to view a user interface that provides a menu of options for the mobility management system. One of the options may be set by the user to authorize the mobile device to become a member of a mesh network. In some arrangements, the mobile device may request user information from the user. For example, the user may be requested to identify one or more security credentials (e.g., username/password, certificate, secure PIN code, etc.) that will be used as the user information for authenticating membership in the mesh network. In response, the user may input or otherwise select the one or more security credentials that the mobile device is to use when authenticating membership in the mesh network. After receiving the indication that authorizes the mobile device to join a mesh network and/or receiving an identification of the user information, the mobile device may proceed to step 803.

At step 803, the mobile device may transmit one or more advertisements for the mobile device. An advertisement may indicate the presence of the mobile device to other devices that are able to receive the advertisement and may be specific to a transport protocol. For example, the mobile device may be configured with a number of radios capable of peer-to-peer communication including, for example, BLUETOOTH and WIFI DIRECT.

Accordingly, the mobile device may determine which types of peer-to-peer connections the mobile device is able to establish based on which peer-to-peer radios or peer-to-peer functionality is currently active on the mobile device (e.g., determine whether the BLUETOOTH radio is active and/or determine whether WIFI DIRECT functionality is enabled). For each type of peer-to-peer connection the mobile device is able to establish, the mobile device may transmit an advertisement using the transport protocol corresponding to that type of peer-to-peer connection. Accordingly, the mobile device may transmit, via a BLUETOOTH communication, an advertisement using a BLUETOOTH protocol. The mobile device may transmit, via a WIFI DIRECT communication, an advertisement using a WIFI DIRECT protocol. In some arrangements, each advertisement transmitted at step 803 may include user information for the mobile device, such as the security credentials identified at step 801.

At step 805, the mobile device may receive one or more advertisements for one or more other mobile devices. The advertisements for the one or more other devices may indicate the presence of the other mobile devices to the mobile device and may be specific to a transport protocol. Additionally, the one or more advertisements for the one or more other devices may be received via the same types of peer-to-peer communications discussed in connection with step 803 (e.g., each of the advertisements received at step 805 may be via a BLUETOOTH communication and/or via a WIFI DIRECT communication). In some instances, the advertisements received at step 805 may have been transmitted by the other mobile devices as a response to an advertisement transmitted by the mobile device at step 803. For example, if an advertisement was transmitted via a BLUETOOTH communication at step 803, the mobile device (e.g., mobile device 702-C) may receive, via the BLUETOOTH communication, at least one advertisement for another mobile device (e.g., mobile device 702-B) as a response to that advertisement. In some arrangements, the one or more advertisements received at step 805 may include user information for the one or more other mobile devices (e.g., the advertisement for mobile device 702-B may include a security credential selected by the user of mobile device 702-B).

In some instances, the mobile device may be configured to disable the attempt to join a mesh network if the mobile device fails to receive any advertisements from other mobile devices within a timeout period (e.g., 10 seconds). For example, after transmitting the one or more advertisements of step 803, the mobile device may begin to wait for advertisements from other mobile devices. If the mobile device fails to receive any advertisements from other mobile devices within a timeout period, the mobile device may provide an error message to the user indicating there are no devices nearby to form the mesh network and, thereafter, the method may end.

At step 807, the mobile device may determine user information for the one or more other mobile devices based on the one or more advertisements received at step 805. For example, in some arrangements, each advertisement may include the user information. Accordingly, the mobile device may extract the user information from the advertisements received at step 805. In other arrangements, the user information may need to be requested from the one or more user devices. Accordingly, the mobile device may determine, for each advertisement received at step 805, which device transmitted the advertisement and may transmit a user information request, via a peer-to-peer communication, to each device determined to transmit an advertisement. Upon transmitting the user information requests, the mobile device may wait to receive the user information. Once the user information for each of the one or more other mobile devices has been determined, the method may proceed to step 809.

At step 809, the mobile device may determine whether to authenticate membership in the mesh network. In some arrangements this determination may be based on the user information of the one or more other devices and the user information of the mobile device. For example, the mobile device may determine, for each of the one or more other mobile devices, whether the user information for the mobile device (e.g., the one or more security credentials identified by the user at step 801) matches the user information received from the other device. If at least one of the other devices has user information that matches the user information for the mobile device, the mobile device may determine that membership in the mesh network is authenticated.

In some arrangements, the mobile device may authenticate membership in the mesh network based on the mobile device and the one or more mobile devices having matching user information. In other words, the mesh network will be established to include devices that have matching user information. Any device that provides non-matching user information will be denied membership in the mesh network. For example, using the mobile devices of FIG. 7 as an illustrative example, mobile device 702-C may have received user information from two devices: user information from mobile device 702-A and user information from mobile device 702-B. In this example, the mobile device 702-C may determine that the user information from the mobile device 702-A does match, but the user information from the mobile device 702-B does not match. In this instance, the mobile device 702-C may determine to authenticate membership of a mesh network that includes only the mobile device 702-C and mobile device 702-A. In this example, the mobile device 702-B will not become a member of the mesh network.

In some variations, the mobile device may authenticate membership in the mesh network based on information stored by or accessible via the access gateway. For example, the access gateway (or a server accessible via the access gateway) may store (e.g., in an XENMOBILE SERVER (XMS) database) identification information for enrolled devices. In some embodiments, the identification information may specify whether each enrolled device is authorized to join a mesh network and/or may include an identification of the user. The mobile device may transmit user information to the access gateway via the virtual private network tunnel. After receipt via the access gateway, a comparison may be performed between the user information and the identification information of the enrolled devices. Based on the comparison, the access gateway may respond with an indication as to whether each of the devices is allowed to join the mesh network. Any device that is allowed to join the mesh network may be authenticated for membership. Any device that is not allowed to join the mesh network may be denied membership.

Upon determining to authenticate membership in the mesh network, the method may proceed to step 811. If the mobile device determines not to authenticate membership in the mesh network (e.g., none of the user information for the other mobile devices matches the user information for the mobile device), the method may end.

At step 811, the mobile device may determine routing information that is usable for routing data to at least one of the one or more other mobile devices. For example, the mobile device may determine which of the one or more other devices is to be a next hop. The mobile device may then determine routing information for communicating data to the next hop. In one particular example, if the mesh network is to include the three mobile devices of FIG. 7 and the mesh network is to be connected using the peer-to-peer connections depicted in FIG. 7, mobile device 702-B may determine routing information for communicating data to mobile device 702-A and 702-B; mobile device 702-C may determine routing information for communicating data to mobile device 702-B; and mobile device 702-A may determine routing information for communicating data to mobile device 702-B. Upon determining the routing information, the method may proceed to step 813.

At step 813, the mobile device may configure itself as a member of the mesh network. For example, as part of the configuration process, the mobile device may store the routing information for later use; may transmit the routing information to the one or more next hops in the mesh network; may exchange data to establish the peer-to-peer connections of the mesh network; and/or may exchange data with the next hops to determine encryption/decryption keys and/or other credentials for communicating via the peer-to-peer connections (e.g., exchange certificates for using SSL with the peer-to-peer connection). In some arrangements, the encryption/decryption keys and/or other credentials for communicating via the peer-to-peer connection may be included in a policy enforced by the enterprise management framework. In some arrangements, establishing the peer-to-peer connections may depend on the type of peer-to-peer connection (e.g., if the peer-to-peer connection 703 of FIG. 7 is a BLUETOOTH connection, mobile devices 702-A and 702-B may complete a pairing process to establish the connection).

In one particular example, if the mesh network is established to include the three mobile devices of FIG. 7 and the mesh network uses the peer-to-peer connections depicted in FIG. 7, the three mobile devices of FIG. 7 will be able to route and transmit data using the mesh network as follows: after the mobile device 702-B has configured itself, mobile device 702-B will be able to route and transmit data, via peer-to-peer connection 705 of the mesh network, to mobile device 702-C and will be able to route and transmit data, via peer-to-peer connection 703 of the mesh network, to mobile device 702-A; after the mobile device 702-A has configured itself, mobile device 702-A will be able to route and transmit data, via peer-to-peer connection 703 of the mesh network, to mobile device 702-B; and after mobile device 702-C has configured itself, mobile device 702-C will be able to route and transmit data, via peer-to-peer connection 705 of the mesh network, to mobile device 702-B.

Figure 9:
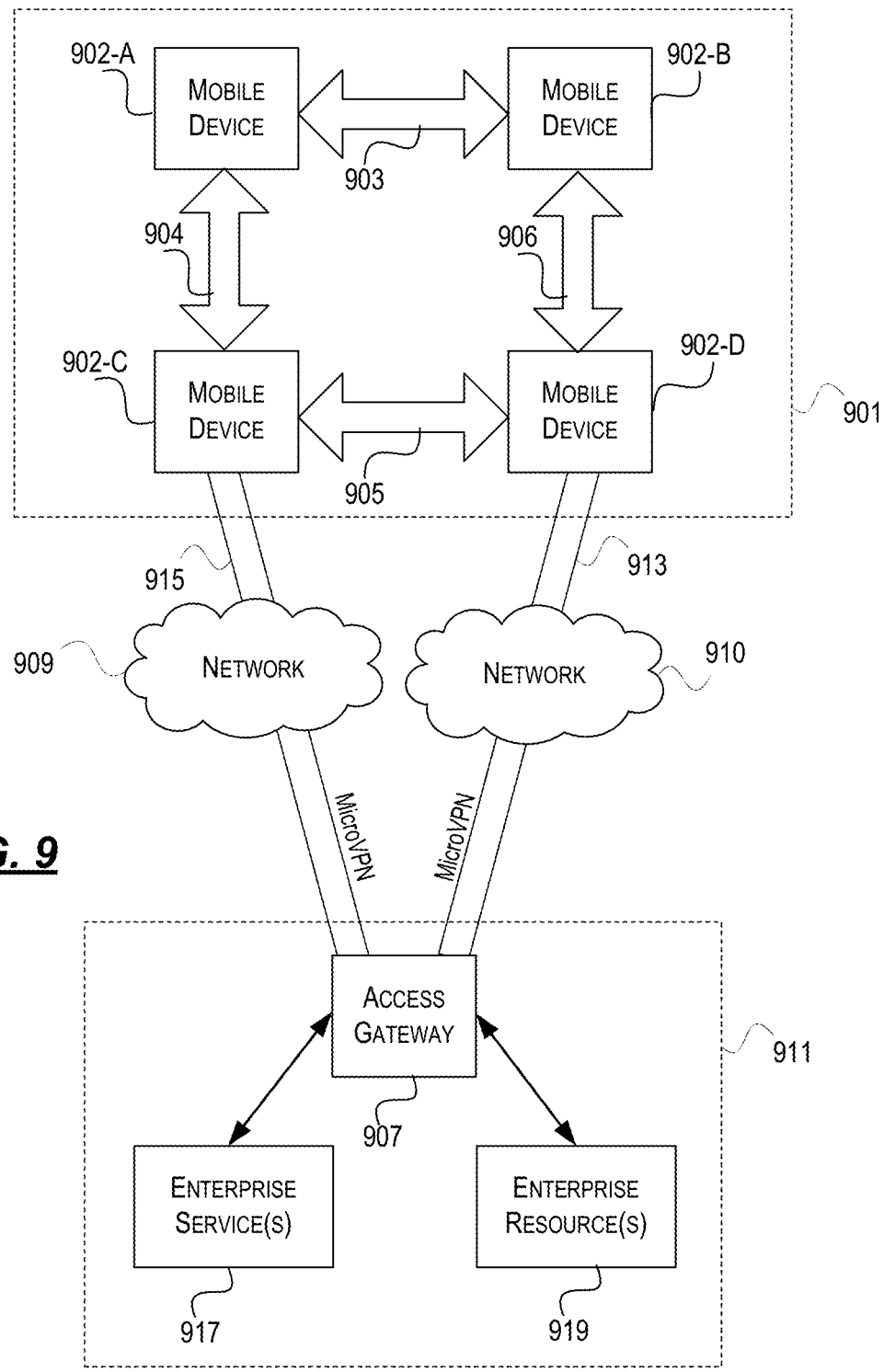
FIG. 9 illustrates another example arrangement in which a user may be able to access enterprise resources and enterprise services using multiple devices in accordance with various aspects described herein

As discussed above, FIG. 7 illustrates an arrangement where a single device, mobile device 702-C, has established a virtual private network connection with an access gateway. In some variations, the enterprise mobility management system may support the establishment of multiple virtual private network connections. Accordingly, two or more devices may have established virtual private network connections with the access gateway. FIG. 9 illustrates one such arrangement where at least two devices have established virtual private network connections with an access gateway.

In particular, the example arrangement of FIG. 9 includes four mobile devices 902-A, 902-B, 902-C and 902-D. Aside from the fourth mobile device, the second virtual private network connection, and the additional peer-to-peer connections for the fourth mobile device, the example arrangement of FIG. 9 includes components similar to those discussed in connection with FIG. 7. Indeed, the four mobile devices 902-A, 902-B, 902-C and 902-D are depicted as being located in a first location 901 (e.g., a single home or premises, an automobile, within a threshold distance from each other, at a geographic area of a particular size, location serviced by the same cellular tower, etc.). Each device may be configured with aspects of the enterprise mobility technical architecture described in connection with FIG. 5 (e.g., configured similar to mobile device 502) and/or the enterprise mobility management system described in connection with FIG. 6 (e.g., configured similar to mobile device 602). Each of the three mobile devices 902-A, 902-B, 902-C and 902-D may be associated with the same user (not shown). The number of mobile devices depicted in FIG. 7 is for illustrative purposes. The user could be associated with more or less mobile devices and the methods described herein apply to arrangements with a different number of mobile devices.

The user may intend to use each of the four mobile devices 902-A, 902-B, 902-C and 902-D to access and use various enterprise resources 919 and/or enterprise services 917. Access to and use of the enterprise resources 919 and the enterprise services 917 may be managed via access gateway 907. The access gateway 907, enterprise resources 919 and/or enterprise services 917 are depicted as being located at a second location 911, which is different or remote from the first location 901. The second location 911 is shown for simplicity. In some arrangements, the enterprise resources 919, the enterprise services 919 and the access gateway 907 may be located at different locations from each other. The access gateway 907 may be configured with aspects of the enterprise mobility technical architecture described in connection with FIG. 5 (e.g., configured similar to access gateway 560) and/or may be configured with aspects of the enterprise mobility management system described in connection with FIG. 6 (e.g., configured similar to gateway server 606). The enterprise resources 919 and the enterprise resources may be similar to those discussed in connection with FIG. 5 and FIG. 6 (e.g., enterprise resources 504, enterprise services 508, enterprise resources/services 608, 609, 620, 622, and the like). The access gateway 907 may also provide functionality in addition to the enterprise resources 919 and the enterprise services 917 including, for example, access to the public Internet 548, an app store 578, and the like.

Each of the four mobile devices 902-A, 902-B, 902-C and 902-D may have capabilities different from each other and, based on the networks available at the first location 901, certain devices may be unable to establish a virtual private network connection to the access gateway 907. As depicted in FIG. 9, mobile device 902-C has established a virtual private network connection 915 with the access gateway 907, and mobile device 902-D has established a virtual private network connection 913 with the access gateway 907. As also depicted in FIG. 9, mobile devices 902-A and 902-B do not have a virtual private network connection established with the access gateway 907. For example, mobile devices 902-C and 902-D may each be a device capable of connecting to a wireless network (e.g., 3G wireless network, 4G wireless network, LTE wireless network, WI-FI wireless local area network, and the like) that enables each of the devices to communicate with the access gateway 909. As depicted in FIG. 9, mobile devices 902-C and 902-D are connected to different wireless networks, with mobile device 902-C being connected to wireless network 909 and mobile device 902-D being connected to wireless network 910 (e.g., wireless network 909 may be a cellular wireless network and wireless network 910 may be a wireless local access network). In some arrangements, mobile devices 902-C and 902-D may be connected to the same wireless network. Mobile devices 902-A and 902-B may each be devices that are incapable of connecting to the wireless networks 909 and 910 (e.g., a tablet computer without the capability of connecting to a 3G, 4G or LTE wireless network) or may be devices in which the user has chosen to not connect to the wireless networks 909 and 910 (e.g., a device with a disabled wireless radio such as a device set in an airplane mode).

Each of the virtual private network connections 913 and 915 may be one or more microVPN connections or application-specific VPN connections similar to those discussed in connection with FIGS. 5 and 6. In such arrangements, the virtual private network connection 913 may allow for the exchange of data traffic between the access gateway 907 and various components of the mobility management system of the mobile device 902-D including, for example, one or more managed applications of the mobile device 902-D (e.g., managed application 514) and/or a client agent of the mobile device 902-D (e.g., client agent 604). Similarly, the virtual private network connection 915 may allow for the exchange of data traffic between the access gateway 907 and various components of the mobility management system of the mobile device 902-C including, for example, one or more managed application of the mobile device 902-C (e.g., managed application 514) and/or a client agent of the mobile device 902-C (e.g., client agent 604). The virtual private network connection 913 may act as a tunnel through the wireless network 910 (and one or more other networks not explicitly shown in FIG. 9). Similarly, the virtual private network connection 915 may act as a tunnel through the wireless network 909 (and one or more other networks not explicitly shown in FIG. 9). Some examples of the types of managed applications/client agents suitable for exchanging data over the virtual private network connections 913 and 914 include, for example, the WORX suite of applications by Citrix System, Inc. (e.g., WORX HOME by Citrix Systems, Inc.; and WORXMAIL by Citrix Systems, Inc., etc.) and other applications/client agents compatible with XENMOBILE by Citrix Systems, Inc.

The four mobile devices 902-A, 902-B, 902-C and 902-D may be configured as members (or nodes) of a mesh network. Like the arrangement discussed in connection with FIG. 7, for clarity and ease of discussion, this disclosure will provide examples of a mesh network that uses a routing technique. Accordingly, as depicted in FIG. 9, the mobile devices 902-A, 902-B, 902-C and 902-D are members of a mesh network and data may be routed throughout the mesh network via peer-to-peer connections 903, 904, 905 and 906. The peer-to-peer connections 903, 904, 905 and 906 may employ one or more transport protocols including, for example, a BLUETOOTH protocol, a WI-FI DIRECT protocol, or any other protocol that allows direct communication between devices in close physical proximity (e.g., peer-to-peer connections 905 and 906 may use a BLUETOOTH protocol and peer-to-peer connections 903 and 904 may use a WI-FI DIRECT protocol). The data transmitted via the peer-to-peer connections 903, 904, 905 and 906 may be encrypted based on one or more encryption schemes. Further, there may be additional peer-to-peer connections between the mobile devices 902-A, 902-B, 902-C and 902-D. For example, a peer-to-peer connection (not shown) may be established between mobile device 902-A and mobile device 902-D. As another example, a second peer-to-peer connection (not shown) may be established between mobile device 902-A and mobile device 902-C in addition to the illustrated peer-to-peer connection 904. The use of a mesh network is for illustrative purposes. Other types of ad-hoc networks or peer-to-peer networks could be used in various embodiments that incorporate aspects described herein. An example method that may be used by each mobile device 902-A, 902-B, 902-C and 902-D to become a member of the mesh network will be discussed below in connection with FIG. 10A. An example method that may be used to manage which of the two virtual private network connections 913 and 914 is used will be discussed below in connection with FIG. 10B. Further details related to establishing a mesh network will be discussed in connection with FIG. 12.

The depicted arrangement may enable data from the mobile devices 902-A and 902-B to be received by the access gateway 907. In this way, mobile device 902-A and 902-B may be able to access and/or use functionality controlled and/or managed by the access gateway 907 including the enterprise resources 919 and the enterprise services 917. For example, data intended for the access gateway 907 (e.g., data generated by a managed application or client agent of mobile device 902-A and 902-B) may be routed and transmitted, via the one or more peer-to-peer connections 903-906 of the mesh network, to the mobile device that has an established connection with the access gateway 907 (e.g., mobile device 902-C or mobile device 902-D). Once received by the mobile device with the established virtual private network connection, the data may be transmitted, via the virtual private network connection, to the access gateway 907 (e.g., via virtual private network connection 913 if the data was routed to mobile device 902-D or via virtual private network connection 915 if the data was routed to mobile device 902-C). The access gateway 907 may transmit data intended for mobile device 902-A or 902-B (e.g., data generated based on an access of the enterprise resources 919 or the enterprise services 917), via a virtual private network connection, to the mobile device that has the established virtual private connection. Once received by the mobile device with the established virtual private connection, the data may be routed and transmitted, via the one or more peer-to-peer connections 903-906 of the mesh network, to the intended destination. Upon receipt, mobile device 902-A or 902-B may process the data in accordance with the application management framework (e.g., provide the data to a managed application, store the data in a container, etc.). For example, a managed mail application of mobile device 902-B may receive email data via the access gateway 907 to allow the user to receive new emails using the virtual private network connection 913. As another example, a managed browser application of mobile device 902-A may be able to receive web browsing data form the access gateway to allow the user to browse the Internet from the mobile device 902-A using the virtual private network connection 913. Additionally, the mesh network may be used to transmit data between the mobile devices 902-A, 902-B, 902-C and 902-D, which may allow for the mobile devices to perform various functions related to the application management framework. For example, screen sharing data may be transmitted among the mobile devices 902-A, 902-B, 902-C and 902-D to allow the user to share a screen from one of the devices. As another example, email data may be transmitted among the mobile devices 902-A, 902-B, 902-C and 902-D to allow the user to sync email messages among the mobile devices 902-A, 902-B, 902-C and 902-D. Further details as to how a mesh network may be used in connection with an enterprise mobility management system will be discussed in connection with FIGS. 11A-11D and FIG. 12.

Figure 10A:
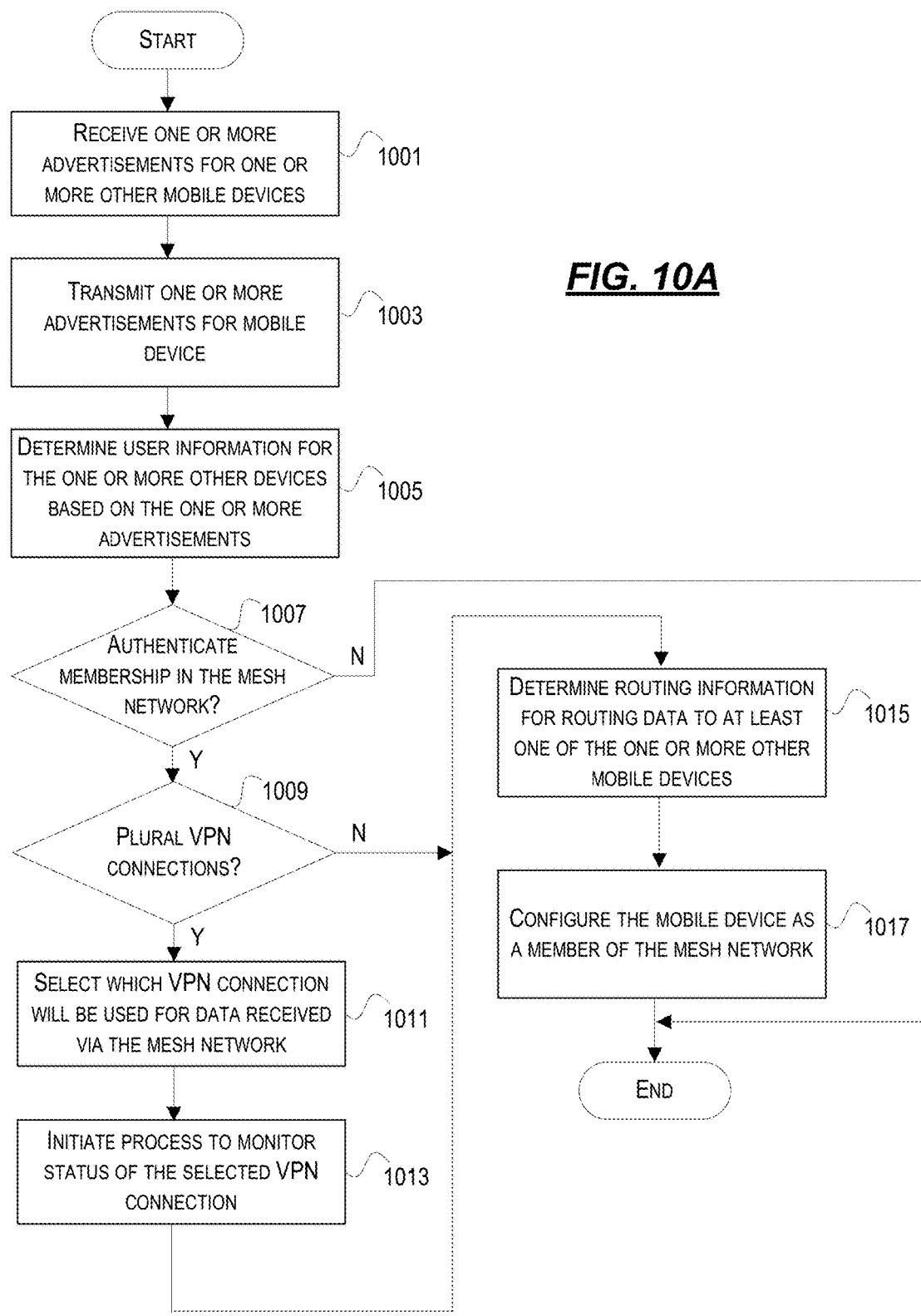
FIG. 10A illustrates another example method that may be used in connection with establishing a mesh network.

FIG. 10A illustrates another example method that may be used in connection with establishing a mesh network. In particular, the example method of FIG. 10A may be used by each of the mobile devices 902-A, 902-B, 902-C and 902-D from FIG. 9 to become members in or otherwise establish a mesh network. In some arrangements, the steps of FIG. 10A may be performed by one or more components of the enterprise mobility management system including, for example, the client agent 604 of FIG. 6. Additionally, the mobile device may, to facilitate the establishment of the mesh network, use a variation on an existing technology such as the OPENGARDEN SDK to assist in advertising the presence of the mobile device and the discovery of nearby devices.

At step 1001, a mobile device may receive one or more advertisements for one or more other mobile devices. Step 1001 may be performed similar to step 805 of FIG. 8. For example, the advertisements for the one or more other devices may indicate the presence of the other mobile devices to the mobile device and may be specific to a transport protocol. The one or more advertisements may be received via one or more peer-to-peer communications (e.g., the advertisements may be received at step 1001 via a BLUETOOTH communication and/or via a WIFI DIRECT communication). In some arrangements, the one or more advertisements received at step 1001 may include user information for the one or more other mobile devices (e.g., the advertisement for mobile device 902-B may include a security credential selected by the user of mobile device 902-B). Additionally, the one or more advertisements received at step 1001 may include an indication as to whether a virtual private network connection to the access gateway has been established for the particular source device of the advertisement (e.g., the advertisement for mobile device 902-B may indicate that a virtual private network connection has not been established; the advertisement for mobile device 902-C may indicate that a virtual private network connection has been established).

In the depicted arrangement, the method may proceed to step 1003 responsive to receiving the one or more advertisements at step 1001. In some arrangements (not shown in FIG. 10A), the mobile device may, prior to proceeding to directly to step 1003, determine whether authorization to become a member of a mesh network was previously received. This determination may be performed, for example, based on the value of a mesh network setting of the mobile device's client agent (e.g., if the mesh network setting indicates that membership in a mesh network is authorized by the user) or based on the mobile device storing a valid authentication token configured for SSO. If authorization was not previously received, the mobile device may prompt the user for the authorization. If authorization was previously received, the method may proceed to step 1003.

At step 1003, the mobile device may transmit one or more advertisements for the mobile device. This step may be performed similar to step 801 of FIG. 8, expect step 1003 may be considered to be performed responsive to, or based on, the mobile device receiving the advertisements at step 1001. In some arrangements, each advertisement transmitted at step 1003 may include user information for the mobile device (e.g., a security credential selected by the user of mobile device 902-D). Additionally, the one or more advertisements transmitted at step 1003 may include an indication as to whether a virtual private network connection to the access gateway has been established for the mobile device.

At step 1005, the mobile device may determine user information for the one or more other mobile devices based on the one or more advertisements received at step 1001. This step may be performed similar to step 807 of FIG. 8 (e.g., extract the user information from the advertisements received at step 1001, transmit user information requests to the one or more user devices, etc.). Additionally, in some arrangements, in addition to or as an alternative from determining the user information, the mobile device may determine indications as to whether virtual private network connections have been established for the one or more other devices (e.g., extract the indications from the advertisements received at step 1001, transmit requests for the indication to the one or more other devices, transmit one or more requests for the indications and the user information to the one or more other devices with each of the requests being a request for an indication and the user information, etc.).

At step 1007, the mobile device may determine whether to authenticate membership in the mesh network. This step may be performed similar to step 809 of FIG. 8 (e.g., perform the determination based on the user information of the one or more other devices and the user information of the mobile device, perform the determination based on the mobile device and the one or more mobile devices having matching user information, etc.). Upon determining to authenticate membership in the mesh network, the method may proceed to step 1009. If the mobile device determines not to authenticate membership in the mesh network (e.g., none of the user information for the other mobile devices matches the user information for the mobile device), the method may end.

At step 1009, the mobile device may determine whether plural (e.g., more than two) virtual private network connections have been established among the devices that are to be members of the mesh network. For example, using the arrangement depicted in FIG. 9 for illustrative purposes, mobile devices 902-A through 902-D may all be authenticated for membership in the mesh network; mobile device 902-D may have received an indication from each of mobile device 902-A, 902-B and 902-C as to whether a virtual private network connection have been established for the respective device; and mobile device 902-D may have access to an indication as to whether a virtual private network has been established for mobile device 902-D. If at least two of the indications for the members of the mesh network (e.g., the indications for mobile device 902-A, 902-B and 902-C and the indication for mobile device 902-D) provides an indication that a virtual private network connection has been established, the mobile device 902-D may determine that plural virtual private network connections have been established. If one or fewer of the indications for the members of the mesh network provide an indication that a virtual private network connection has been established, the mobile device 902-D may determine that plural virtual private network connection have not been established. Looking to the specific arrangement depicted in FIG. 9, the mobile device may determine that plural virtual private network connections have been established because both mobile device 902-C and 902-D would provide indications that virtual private connections have been established.

Upon determining that plural virtual private network connections have been established, the method may proceed to step 1011. If the mobile determines that plural virtual private network connections have not been established, the method may proceed to step 1015.

At step 1011, the mobile device may select which of the plural virtual private network connections will be used for data that has been received over the mesh network and that is intended for the access gateway. The mobile device may perform this selection based on a comparison of measurements related to the plural virtual private network connections. In some arrangements, the selection may be based on which of the plural virtual private network connections is determined to be the fastest. For example, each mobile device with an established virtual private network connection may provide one or more measurements of the established virtual private network connection (e.g., an average or instantaneous bandwidth measurement for the virtual private network, an instantaneous or average ping time over the connection with the access gateway, etc.). Based on these measurements, the mobile device may select one of the plural virtual private network connections (e.g. select the virtual private network with the highest bandwidth; select the virtual private network with the lowest ping time, based on a weighted combination of bandwidth and ping time, etc.). The one or more measurements may be provided along with the indication that the virtual private network connection has been established or responsive to a separate request by the mobile device. As a specific example using the arrangement illustrated in FIG. 9, mobile device 902-C may have provided a ping time of 5 milliseconds for accessing the access gateway 907 via virtual private network connection 915 to mobile device 902-D; and mobile device 902-D may have measured a ping time of 10 milliseconds for accessing the access gateway 907 via virtual private network connection 913. Accordingly, mobile device 902-D may select, based on the lower ping time, virtual private network connection 915 as the connection that will be used for data that has been received over the mesh network and that is intended for the access gateway.

At step 1013, the mobile device may a process to monitor status of the selected virtual private network connection. Further details regarding the process to monitor the status of the selected virtual private network connection will be discussed in terms of FIG. 10B.

At step 1015, the mobile device may determine routing information that is usable for routing data to at least one of the one or more other mobile devices. This step may be performed similar to step 811 of FIG. 8. Additionally, the routing information may be determined based on which virtual private network connection was selected at step 1011. For example, using the illustrative arrangement depicted in FIG. 10 and assuming that virtual private network connection 913 has been selected at step 1011, the routing information may be determined to indicate that data received by mobile device 902-C from mobile device 902-A should be routed to mobile device 902-D if that data is intended for the access gateway 907.

At step 1017, the mobile device may configure itself as a member of the mesh network. This step may be performed similar to step 813 of FIG. 8. For example, as part of the configuration process, the mobile device may store the routing information for later use; may transmit the routing information to the one or more next hops in the mesh network; may exchange data to establish the peer-to-peer connections of the mesh network; and/or may exchange data with the next hops to determine encryption keys for communicating via the peer-to-peer connections. Additionally, in view of the routing information being based on which virtual private network connection was selected at step 1011, the configuration performed by the mobile device may be performed based on which virtual private network connection was selected at step 1011.

In one particular example, if the mesh network is established to include the four mobile devices of FIG. 9 and the mesh network uses the peer-to-peer connections depicted in FIG. 9, the four mobile devices of FIG. 9 will be able to route and transmit data using the mesh network as follows: after the mobile device 902-A has configured itself, mobile device 902-A will be able to route and transmit data, via peer-to-peer connection 903 of the mesh network, to mobile device 902-B and will be able to route and transmit data, via peer-to-peer connection 904 of the mesh network, to mobile device 902-C; after the mobile device 902-B has configured itself, mobile device 902-B will be able to route and transmit data, via peer-to-peer connection 903 of the mesh network, to mobile device 702-A and will be able to route and transmit data, via peer-to-peer connection 906 of the mesh network, to mobile device 902-D; after mobile device 902-C has configured itself, mobile device 902-C will be able to route and transmit data, via peer-to-peer connection 904 of the mesh network, to mobile device 902-A and will be able to route and transmit data, via peer-to-peer connection 905 of the mesh network, to mobile device 902-D; and after mobile device 902-D has configured itself, mobile device 902-D will be able to route and transmit data, via peer-to-peer connection 905 of the mesh network, to mobile device 902-C and will be able to route and transmit data, via peer-to-peer connection 906 of the mesh network, to mobile device 902-B.

In view of the above discussion and in general, the example method of FIG. 10A includes a number of steps similar to those discussed in connection with FIG. 8. However, the example method of FIG. 10A includes various steps and/or an arrangement of steps that may be considered as alternatives to or additions to the steps discussed in connection with FIG. 8. For example, steps 1001 and 1003 of FIG. 10A could be used in place of steps 801, 803 and 805, in some embodiments. As another example, step 1009, 1011, 1013 and 1015 may be added to the example method of FIG. 8, in some variations. As yet another example, step 801 of FIG. 8 may be performed in addition to the steps performed in the example method of FIG. 10A.

Further, the mobile devices may be configured to perform one or more different variations of the methods described in connection with FIGS. 8 and 10A. For example, each mobile device may be configured to perform one of two methods that may be used in connection with establishing a mesh network based on whether a user initiates an attempt to establish a mesh network prior to the mobile device receiving an advertisement via a peer-to-peer communication. Indeed, as a specific example using the illustrative arrangement of FIG. 9, a user may interact with a user interface on the mobile device 902-D and press a button (choose a menu option, or otherwise change a setting) that initiates or otherwise causes the mobile device to attempt to establish a mesh network. Accordingly, mobile device 902-D may perform steps 801-805 of FIG. 8 based on the user's initiation and then proceed with performing the method of FIG. 10A beginning at step 1005. Based on the method performed at step 902-D, other mobiles devices (e.g., mobile device 902-A, 902-B and 902-C) may receive an advertisement from mobile device 902-D. Each of mobile device 902-A, 902-B and 902-C may proceed with performing the method of 10A based on device 902-A, 902-B and 902-C receiving the advertisement prior to a user initiating an attempt to establish a mesh network on device 902-A, 902-B an 902-C. The above-described variations to FIGS. 8 and 10A are only a few examples of the numerous variations that embodiments may use in connection with establishing a mesh network.

Figure 10B:
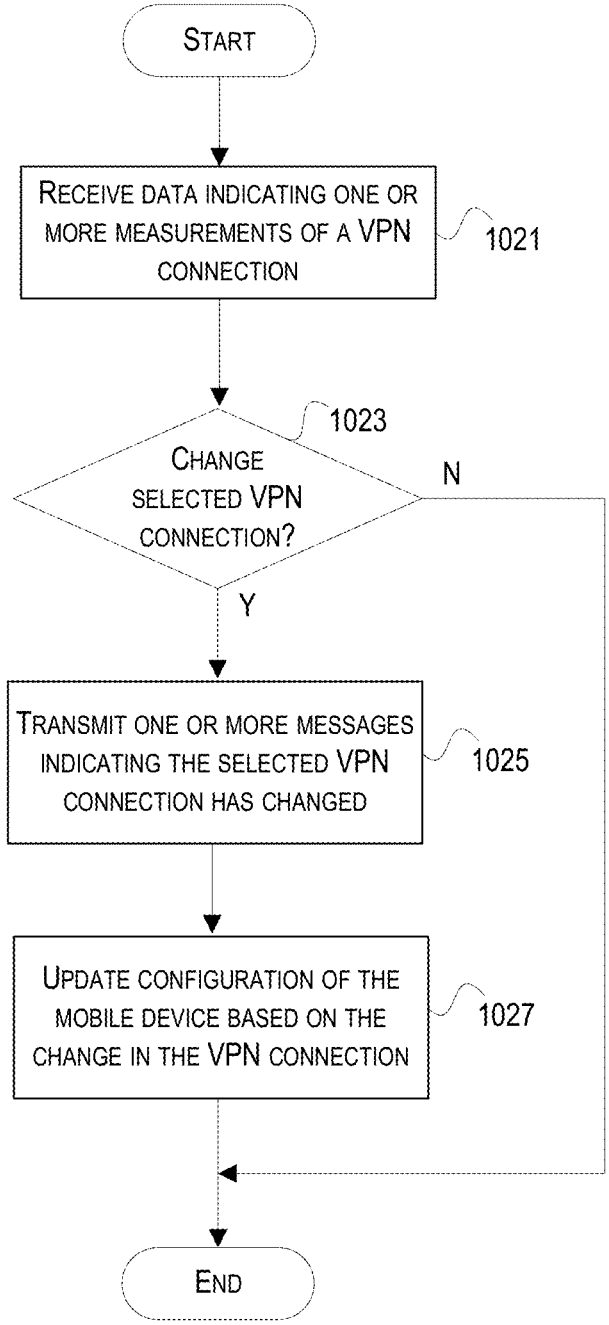
FIG. 10B illustrates an example method that may be used in connection with managing a mesh network.

FIG. 10B illustrates an example method that may be used in connection with managing a mesh network. In particular FIG. 10B illustrates an example method for monitoring the status of a selected virtual private network connection. In particular, the example method of FIG. 10B may be used by each of the mobile devices 902-A, 902-B, 902-C and 902-D from FIG. 9 to monitor the status of a selected virtual private network connection. In some arrangements, the steps of FIG. 10B may be performed by one or more components of the enterprise mobility management system including, for example, the client agent 604 of FIG. 6.

At step 1021, the mobile device may receive data indicating one or more measurements of a virtual private network connection. The data may indicate a performance of virtual private network connection (e.g., an average or instantaneous bandwidth measurement for the virtual private network, an instantaneous or average ping time over the connection with the access gateway, etc.) Alternatively or additionally, the data may indicate that a virtual private network connection has failed. The data received at step 1021 may be received in response to a request transmitted by the mobile device for the one or more measurements. The data may also be received based on a periodic schedule (e.g., the mobile devices with established virtual private network connections may determine the one or more measurements and transmit the data periodically such as every 5 seconds, every 5 minutes, every hour, etc.) The data may further be received based on a device determining that performance of the virtual private network connection has changed more than a predetermined threshold (e.g., the mobile devices with established virtual private network connections may transmit the data after determining that the established connection has failed; may transmit the data upon determining that a bandwidth measurement decreased by a specified amount of megabits per second; may transmit the data upon determining that a ping time increased by a specified number of milliseconds, etc.). As a specific example, using the illustrative arrangement of FIG. 9, mobile device 902-D may receive data at step 1021 from mobile device 902-C, via peer-to-peer connection 905, indicating one or more measurements of virtual private network connection 915.

At step 1023, the mobile device may determine whether to change the selected virtual private network connection. For example, this determination may be based on a comparison of a measurement for the selected virtual private network connection and the other established virtual private network connection. The comparison may be performed similarly to the comparison discussed in connection with step 1011 of FIG. 10A. As a specific example, using the illustrative arrangement of FIG. 9 and assuming virtual private network connection 915 is the currently selected virtual private network connection, mobile device 902-C may have most recently provided a ping time of 30 milliseconds for accessing the access gateway 907 via virtual private network connection 915 to mobile device 902-D; and mobile device 902-D may have most recently measured a ping time of 10 milliseconds for accessing the access gateway 907 via virtual private network connection 913. Accordingly, mobile device 902-D may determine, based on the lower ping time for virtual private network connection 913, that the selected virtual private network connection should be changed to virtual private network connection 913.

Upon determining that the selected virtual private network connection should change, the method may proceed to step 1025. If the mobile device determines that the selected virtual private network connection should not be changed, the method may end.

At step 1025, the mobile device may transmit one or more messages indicating the selected virtual private network connection has changed. In some arrangements the one or more messages are transmitted so that each member of the mesh network is notified of the change. Upon receiving a message, each member of the mesh network may proceed with updating its configuration based on the change in the selected virtual private network connection. For example, using the illustrative arrangement of FIG. 9 and assuming virtual private network connection 913 is the newly selected virtual private network connection, mobile devices 902-A, 902-B and 902-C may be each transmitted a message indicating that the selected VPN connection has changed; and each of the mobile devices 902-A, 902-B and 902-C may, responsive to receiving the message, may update its configuration based on the change in the selected virtual private network connection (e.g., update stored routing information, and the like) so that data intended for the access gateway 907 is routed to mobile device 902-C.

At step 1027, the mobile device may update its configuration based on the change in the selected virtual private network connection. For example, the mobile device may update stored routing information and other configuration settings so that data intended for the access gateway is routed so that the data can be transmitted to the access gateway via the newly selected virtual private network connection. Continuing the specific example discussed at step 1025, the mobile device 902-D may update its configuration so that data intended for the access gateway 907 is routed to mobile device 902-C using peer-to-peer connection 905.

FIG. 11A-11D illustrate example methods that may be used in connection with using a mesh network in accordance with various aspects described herein. In particular, the example methods of FIGS. 11A-11D may be used by the mobile devices illustrated in FIGS. 7 and 9 after establishing a mesh network to perform various functions in connection with the enterprise mobility management system. In some arrangements, the various steps depicted throughout the example methods of FIGS. 11A-11D may be performed by one or more components of the enterprise mobility management system including, for example, the client agent 604 of FIG. 6 and/or a managed application of FIGS. 5 and 6. Additionally, the mobile device may use a variation on an existing technology such as the OPENGARDEN SDK to assist in routing data between members of the mesh network. Further details regarding the various functions that may be performed based on the example methods of FIGS. 11A-11D will be discussed in FIG. 12.

Figure 11A:
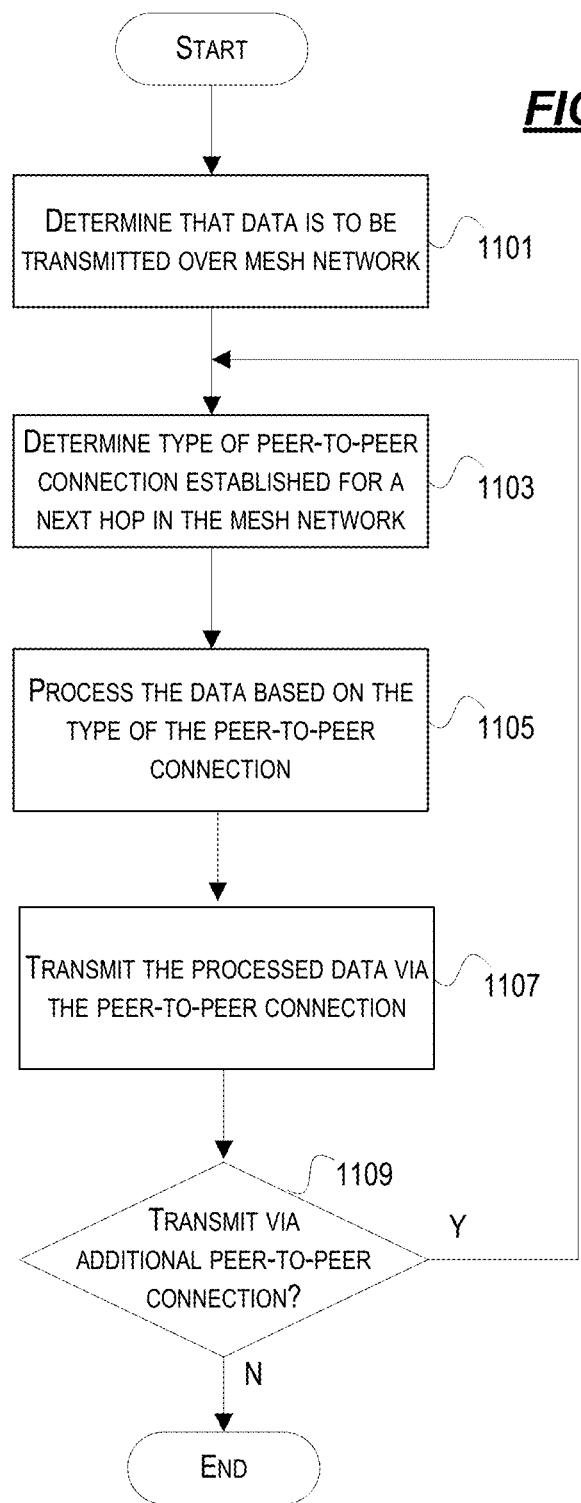
FIG. 11A-11D illustrate example methods that may be used in connection with using a mesh network in accordance with various aspects described herein.

FIG. 11A illustrates an example method in which a mobile device may transmit data it generates over the mesh network.

At step 1101, a mobile device may determine that data is to be transmitted over a mesh network. The determination may be performed by, for example, a managed application or a client agent on the client device. Additionally, the determination may be performed based on various types of data processing that are performed when executing a managed application or providing functionality of the enterprise mobility management system. For example, the determination may be performed based on a managed application generating data that is intended for an access gateway, based on generating data that is intended for another member of the mesh network, and/or based on retrieving data from a secure container. As a more particular example, a managed email application may proceed through a sync mail process that attempts to sync the emails of members on the mesh network. Accordingly the data may comprise an indication of the attempt to sync the emails and/or email data required to complete the sync mail process. As another more particular example, a managed application may generate data indicating a request to access an enterprise resource or enterprise service accessible via an access gateway. Accordingly, the data may include an indication of the request, an indication of which resource or service is being requested, and/or any security credentials that may be needed to complete the request (e.g., a valid authentication token configured for SSO, username/password, etc.).

After determining the data that is to be transmitted over the mesh network, the method may proceed to step 1103-1109 of FIG. 11A illustrate an iterative process that may allow the mobile device to transmit the data determined at step 1101 over one or more peer-to-peer connections. For example, using the illustrative arrangement of FIG. 9, the iterative process represented by steps 1103-1109 may allow mobile device 902-A to transmit data, via peer-to-peer connection 903 and/or peer-to-peer connection 904, to the next hops in the mesh network.

At step 1103, the mobile device may determine a type of a peer-to-peer connection that is established for a next hop in the mesh network. This determination may be based on the routing information for the mesh network that is stored by the mobile device and/or any other information stored by the mobile device in connection with its configuration as a member of the mesh network. For example, using the illustrative arrangement of FIG. 9, mobile device 902-A may determine, for the next hop to mobile device 902-B, that the peer-to-peer connection is a BLUETOOTH connection. As an alternative example, mobile device 902-B may determine, for the next hop to mobile device 902-D, that the peer-to-peer connection is a WI-FI DIRECT connection.

At step 1105, the mobile device may process, based on the type of peer-to-peer connection, the data that is to be transmitted over the mesh network. For example, if the type of peer-to-peer connection is determined to be a BLUETOOTH connection, the data determined at step 1101 may be processed to conform to a BLUETOOTH protocol. As another example, if the type of peer-to-peer connection is determined to be a WI-FI DIRECT connection, the data determined at step 1101 may be processed to conform to a WI-FI DIRECT protocol.

Further, processing the data may include encrypting the data according to an encryption scheme required for communicating data via the peer-to-peer connection. For example, in some variations, an encryption key may be retrieved from a policy of the enterprise management framework and used to encrypt the data. In other variations, an encryption key may have been determined when the mobile device configured itself as a member of the mesh network (e.g., step 813 of FIG. 8 and step 1017 of FIG. 10A) and that encryption key may be used to encrypt the data.

At step 1107, the mobile device may transmit the processed data via the peer-to-peer connection. For example, the mobile device may transmit the processed data resulting from step 1105 via a BLUETOOTH connection using one or more BLUETOOTH communications. As another example, the mobile device may transmit the processed data resulting from step 1105 via a WI-FI DIRECT connection using one or more WI-FI DIRECT communications. In a more particular example, using the illustrative arrangement of FIG. 9, mobile device 902-A may transmit, to mobile device 902-B, via peer-to-peer connection 903, one or more BLUETOOTH communications that include the data determined at step 1101.

At step 1109, the mobile device may determine whether the data needs to be transmitted via an additional peer-to-peer connection. In some arrangements, this may include analyzing the routing information to determine whether an additional peer-to-peer connection has been established to one of the next hops and determine that the data determined at step 1101 has not yet been transmitted over that peer-to-peer connection. For example, using the illustrative arrangement of FIG. 9, mobile device 902-A may perform this determination by identifying peer-to-peer connection 904 based on the routing information and determining that the data determined at step 1101 has not been transmitted over the peer-to-peer connection 904. Upon determining that the data needs to be transmitted via an additional peer-to-peer connection, the method may proceed back to step 1103 to repeat the iterative process represented by steps 1103-1109 (e.g., repeated for peer-to-peer connection 904). Upon determining that the data does not need to be transmitted via an additional peer-to-peer connection, the method may end.

Figure 11B:
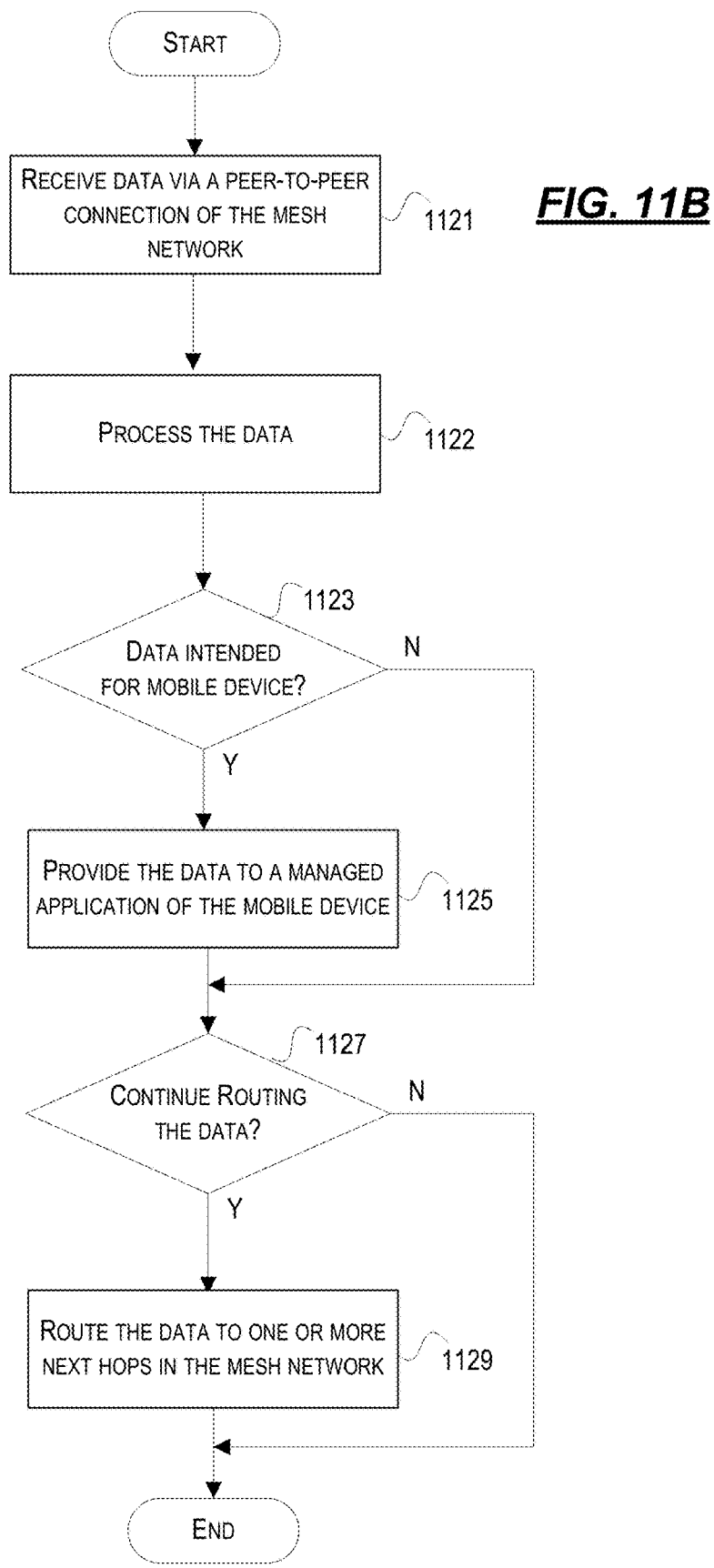

FIG. 11B illustrates an example method in which a mobile device may route data it receives via a peer-to-peer connection to a next hop of the mesh network.

At step 1121, a mobile device may receive data via a peer-to-peer connection of the mesh network. The data may be received in one or more communications conforming to the type of peer-to-peer connection. For example, if the peer-to-peer connection is a BLUETOOTH connection, the data may be received in one or more BLUETOOTH communications. If the peer-to-peer connection is a WI-FI DIRECT connection, the data may be received in one or more WI-FI DIRECT communications. In one particular example, using the illustrative arrangement of FIG. 9, mobile device 902-B may receive, via peer-to-peer communication 903, one or more BLUETOOTH communications that includes data that is to be transmitted over the mesh network (e.g., data determined at step 1101 of FIG. 11A). In some arrangements, the data may need to be decrypted prior to proceeding to the next steps of FIG. 11B.

At step 1122, the mobile device may process the data received at step 1121. For example, processing the data may include extracting the data from its transport packets (e.g., extract the data from one or more BLUETOOTH packets, extract the data from one or more WI-FI DIRECT packets, etc.). Further, processing the data may include decrypting the data according to an encryption scheme required for communicating data via the peer-to-peer connection. For example, in some variations, a decryption key may be retrieved from a policy of the enterprise management framework and used to decrypt the data. In other variations, an decryption key may have been determined when the mobile device configured itself as a member of the mesh network (e.g., step 813 of FIG. 8 and step 1017 of FIG. 10A) and that decryption key may be used to decrypt the data.

At step 1123, the mobile device may determine whether the data, which was received at step 1121 and processed at step 1122, is intended for the mobile device. For example, some of the data transmitted over the mesh network may be intended for various members of the mesh network, while other data may be intended for an access gateway. The mobile device may perform this determination based on the intended destination (e.g., if the data is intended for the access gateway, the data is not intended for the mobile device; if the data is intended for the mobile device, the data is intended for the mobile device; and/or if the data is intended for all members of the mesh network, the data is intended for the mobile device). Additionally or alternatively, the mobile device may perform this determination based on an analysis of the data. For example, the analysis may identify a type of the data (e.g., identify the type as a sync email message or some other type associated with a sync mail process). Based on identifying the type, the mobile device may determine whether the data is intended for the device (e.g., if the type is a sync email message, the data may be intended for the mobile device; if the type is a request for accessing an enterprise resource, the data may not be intended for the mobile device; and the like). Upon determining that the data is intended for the mobile device, the method may proceed to step 1125. If the mobile device determines that the data is not intended for the mobile device, the method may proceed to step 1127.

At step 1125, the mobile device may provide the data to a managed application of the mobile device. For example, sync email messages may be provided to a managed mail application of the mobile device. Web browsing messages may be provided to a managed browser application of the mobile device. In general, the mobile device may be able to provide data to any managed application installed on the mobile device. Accordingly, the data may be provided to any application that processes the type of the data.

At step 1127, the mobile device may determine whether to continue routing the data over the mesh network. For example, some of the data transmitted over the mesh network may be intended for various members of the mesh network, while other data may be intended for an access gateway. The mobile device may perform this determination based on the intended destination (e.g., if the data is intended for the access gateway, continue routing the data; if the data is only intended for the mobile device, do not continue routing the data; and/or if the data is intended for all members of the mesh network, continue routing the data). Additionally or alternatively, the mobile device may perform this determination based on an analysis of the data. For example, the analysis may identify a type of the data (e.g., identify the type as a sync email message or some other type associated with a sync mail process). Based on identifying the type, the mobile device may determine whether to continue routing the data (e.g., if the type is a sync email message, continue routing the data; if the type is a request for accessing an enterprise resource, continue routing the data; if the type is a chat message, do not continue routing the data; and the like).

Further, the mobile device may perform this determination based on the number of peer-to-peer connections established for the mobile device in the mesh network and/or the peer-to-peer connection on which the data was received. For example, using the illustrative arrangement of FIG. 9, if mobile device 902-B received the data via peer-to-peer connection 903, the mobile device 902-B may determine to continue routing based on peer-to-peer connection 904 being established. Additionally, the mobile device 902-B may determine whether another copy of the data was previously received via peer-to-peer connection 904 and, if another copy of the data was previously received via peer-to-peer connection 904, the mobile device may determine not to continue routing the data. As another example, using the illustrative arrangement of FIG. 7, if mobile device 702-A received the data via peer-to-peer connection 703, the mobile device 702-A may determine that no other peer-to-peer connection exists and, accordingly, may determine not to continue routing the data.

Upon determining to continue routing the data over the mesh network, the method may proceed to step 1129. If the mobile device determines not to continue routing the data over the mesh network, the method may end.

At step 1129, the mobile device may route the data to one or more next hops in the mesh network. This step may be performed similar to the iterative process represented by steps 1103-1109 of FIG. 11A. For example, routing the data to one or more next hops in the mesh network may be performed by performing the iterative process represented by steps 1103-1109 to cause the mobile device to transmit the data to one or more next hops on the mesh network using one or more peer-to-peer communications corresponding to each next hop. As a particular example, using the illustrative arrangement of FIG. 9, if mobile device 902-B received the data via peer-to-peer connection 903, mobile device 902-B may perform the iterative process to route the data to mobile device 902-D by transmitting the data via peer-to-peer connection 906.

Further, in some arrangements, the mobile device 902-B may perform the iterative process to route the data to mobile device 902-D in an encrypted form (e.g., as discussed in connection with step 1105 of FIG. 11A). Additionally, in some arrangements, the encrypted form may be different for each of the peer-to-peer connections in the mesh network (e.g., peer-to-peer connection 903 uses different encryption/decryption keys than peer-to-peer connection 905). Accordingly, in one or more of these arrangements, the data may be first decrypted based on the peer-to-peer connection on which the data was received (e.g., as discussed in connection with step 1122 of FIG. 11B) and may be re-encrypted based on the peer-to-peer connection on which the data will be transmitted to the next hop in the mesh network (e.g., as discussed in connection with step 1105 of FIG. 11A). In some variations, however, the mesh network may use the same encryption scheme for each peer-to-peer connection. Accordingly, in one or more of these variations, if the data was received via a peer-to-peer connection, the data, or a portion thereof, may not need to be decrypted and re-encrypted (e.g., the decryption discussed in connection with step 1122 of FIG. 11B may not be performed and the encryption discussed in connection with step 1105 of FIG. 11A may not be performed).

Figure 11C:
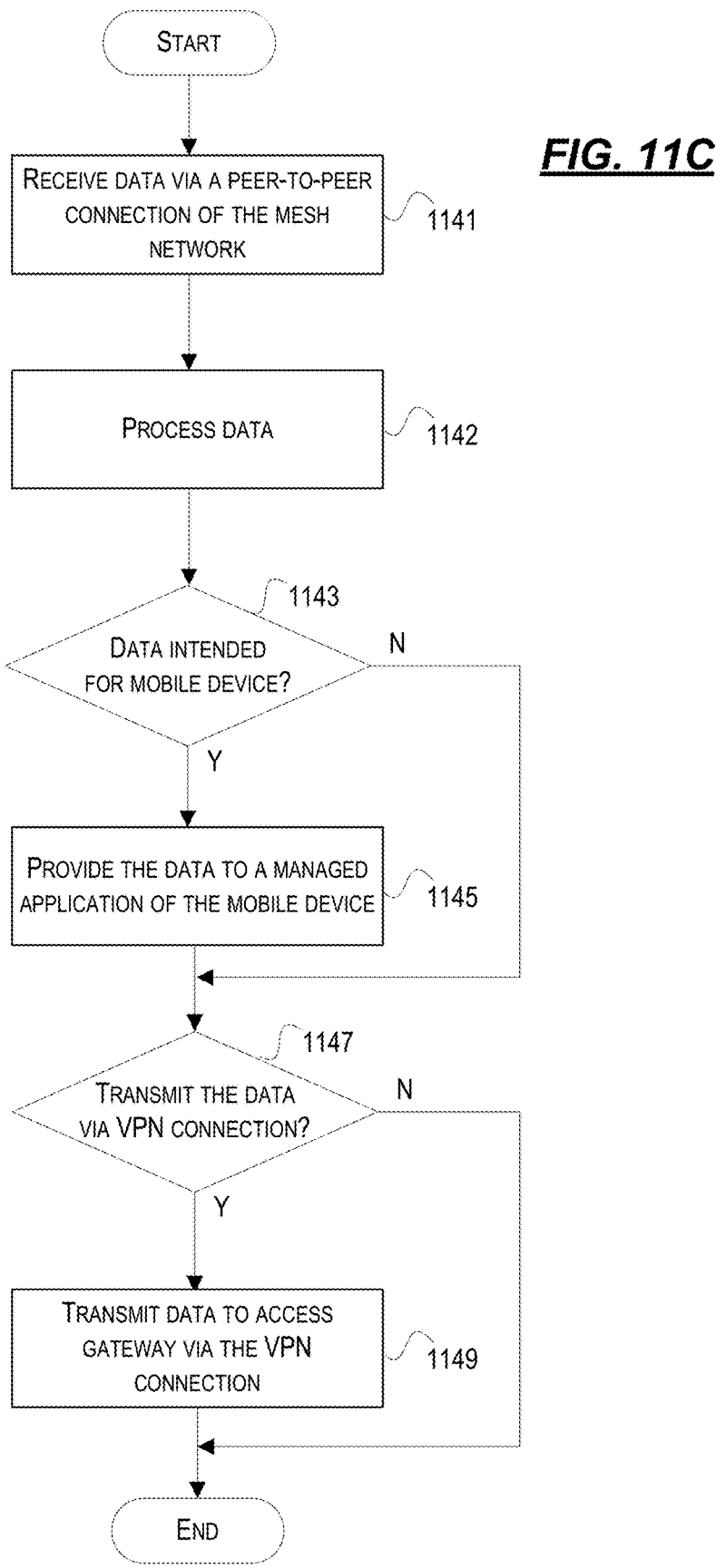

FIG. 11C illustrates an example method in which a mobile device may transmit data it receives via a peer-to-peer connection to an access gateway using a virtual private network connection. In some arrangements, the example method FIG. 11C may be performed by devices that have an established virtual private network connection (e.g., mobile device 702-C, mobile device 902-C and/or mobile device 902-D). Further, in some arrangements the example method of FIG. 11C may be performed by devices that have an established virtual private network connection that is currently selected (e.g., selected via step 1011 of FIG. 10A, or selected via the change that is determined by the example method of FIG. 10B).

At step 1141, a mobile device may receive data via a peer-to-peer connection of the mesh network. This step may be performed similar to step 1121 of FIG. 11B.

At step 1142, the mobile device may process the data received at step 1141. This step may be performed similar to step 1122 of FIG. 11B.

At step 1143, the mobile device may determine whether the data, which was received at step 1141 and processed at step 1142, is intended for the mobile device. This step may be performed similar to step 1123 of FIG. 11B.

At step 1145, the mobile device may provide the data to a managed application of the mobile device. This step may be performed similar to step 1135 of FIG. 11B.

At step 1147, the mobile device may determine whether to transmit the data via a virtual private network connection. For example, some of the data transmitted over the mesh network may be intended for various members of the mesh network, while other data may be intended for an access gateway. The mobile device may perform this determination based on the intended destination (e.g., if the data is intended for the access gateway, transmit the data via a virtual private network connection; if the data is only intended for the mobile device, do not transmit the data via a virtual private network connection; and/or if the data is intended for only members of the mesh network, do not transmit the data via a virtual private network connection). Additionally or alternatively, the mobile device may perform this determination based on an analysis of the data. For example, the analysis may identify a type of the data (e.g., identify the type as a sync email message or some other type associated with a sync mail process). Based on identifying the type, the mobile device may determine whether to transmit the data via a virtual private network connection (e.g., if the type is a sync email message, do not transmit the data via a virtual private network connection; if the type is a request for accessing an enterprise resource, transmit the data via a virtual private network connection; if the type is a chat message, do not transmit the data via a virtual private network connection; and the like).

Upon determining to transmit the data via a virtual private network connection, the method may proceed to step 1149. If the mobile device determines not to transmit the data via a virtual private network connection, the method may end.

At step 1149, the mobile device may transmit the data to the access gateway via the virtual private network connection. For example, the mobile device may process the data to conform to a protocol associated with the virtual private network connection and/or may encrypt the data as required by the virtual private network connection. Once processed, the mobile device may transmit the data to the access gateway. Upon receipt, the access gateway may process the data appropriately (e.g., allow the access to the enterprise resource/service, etc.).

Additionally, in some embodiments, prior to ending the example method of FIG. 11C, the mobile device may determine whether to continue routing the data to members of the mesh network. This determination may be performed similar to step 1127 of FIG. 11B. Upon determining the continue routing the data, the mobile device may proceed to route the data accordingly (e.g., by routing the similar to step 1129 of FIG. 11B). If the mobile device determines not to continue routing the data, the method may end. Alternatively, the mobile device may perform both example methods of FIGS. 11B and 11C upon receiving data via a peer-to-peer connection, with each example method being performed in its own thread.

Figure 11D:
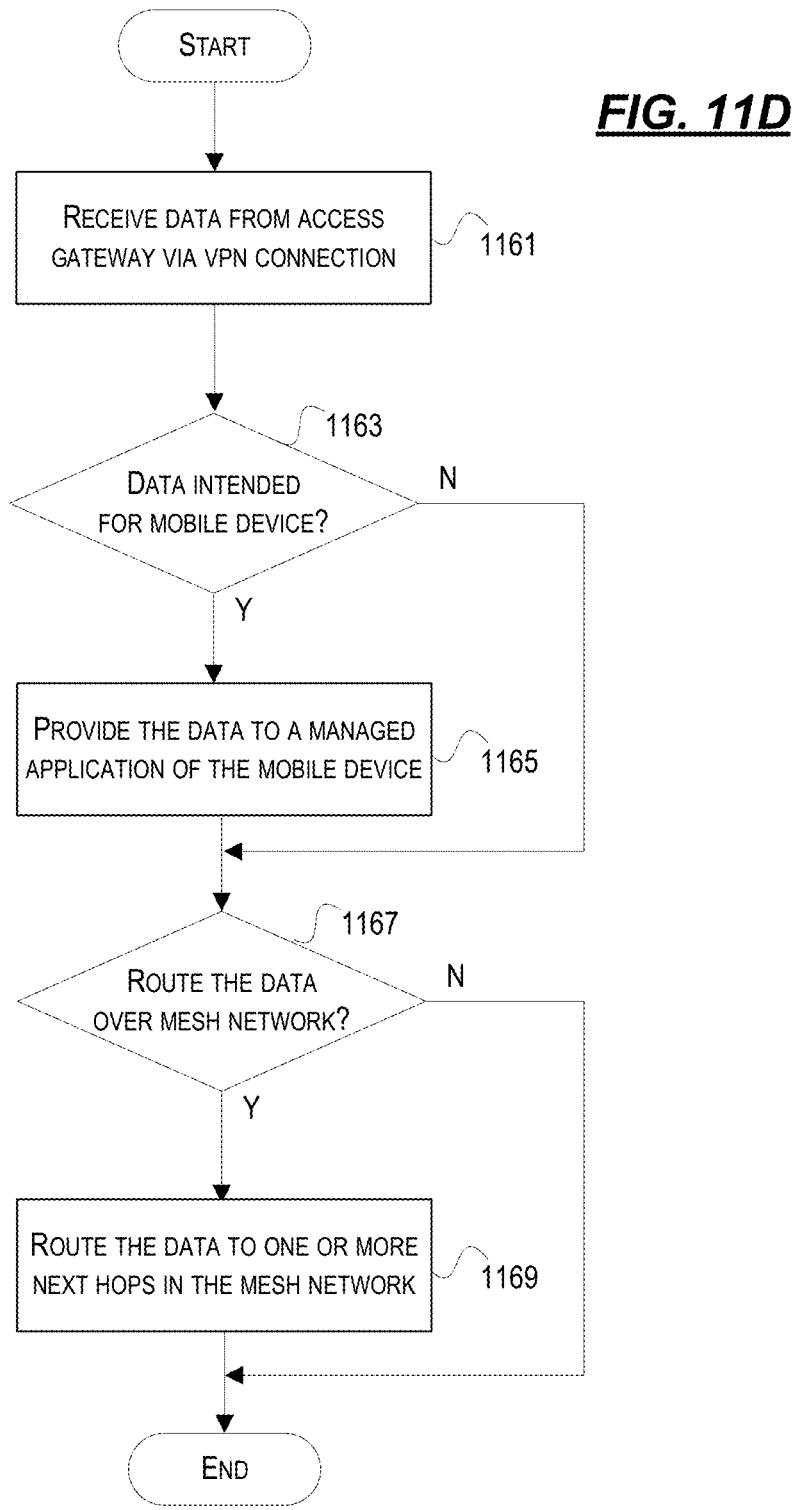

FIG. 11D illustrates an example method in which a mobile device may route data it receives via a virtual private network connection to a next hop of the mesh network. In some arrangements, the example method FIG. 11D may be performed by devices that have an established virtual private network connection (e.g., mobile device 702-C, mobile device 902-C and/or mobile device 902-D). Further, in some arrangements the example method of FIG. 11D may be performed by devices that have an established virtual private network connection that is currently selected (e.g., selected via step 1011 of FIG. 10A, or selected via the change that is determined by the example method of FIG. 10B).

At step 1161, a mobile device may receive data from an access gateway via a virtual private network connection. In some instances, this data may be in response to a previous data transmission to the access gateway via the virtual private network connection. In other instances, this data may be data that is being pushed by the access gateway to one or more members of the mesh network. Upon receiving the data, the mobile device may process the data (e.g., extract the data from the virtual private network data communication, decrypt the data, etc.) prior to proceeding with the remaining steps of FIG. 11D.

At step 1163, the mobile device may determine whether the data is intended for the mobile device. This step may be performed similar to step 1123 of FIG. 11B.

At step 1165, the mobile device may provide the data to a managed application of the mobile device. This step may be performed similar to step 1135 of FIG. 11B.

At step 1167, the mobile device may determine whether to route the data over the mesh network. For example, some of the data received via the virtual private network connection may be intended for various members of the mesh network, while other data may be intended only for the mobile device. The mobile device may perform this determination based on the intended destination (e.g., if the data is only intended for the mobile device, do not route the data over the mesh network; if the data is intended for a member of the mesh network, route the data over the mesh network; and/or if the data is intended for all members of the mesh network, route the data over the mesh network). Additionally or alternatively, the mobile device may perform this determination based on an analysis of the data. For example, the analysis may identify a type of the data (e.g., identify the type as an email message or some other type associated with an email service). Based on identifying the type, the mobile device may determine whether to route the data over the mesh network (e.g., if the type is an email message, route the data over the mesh network; and the like).

Upon determining to route the data over the mesh network, the method may proceed to step 1169. If the mobile device determines not to route the data over the mesh network, the method may end.

At step 1169, the mobile device may route the data to one or more next hops in the mesh network. This step may be performed similar to step 1129 of FIG. 11B. As a particular example, using the illustrative arrangement of FIG. 9, if mobile device 902-D received the data via virtual private network connection 913, mobile device 902-D may perform an iterative process to route the data to mobile devices 902-B and 902-C by transmitting the data, respectively, via peer-to-peer connection 906 and 905.

Figure 12:
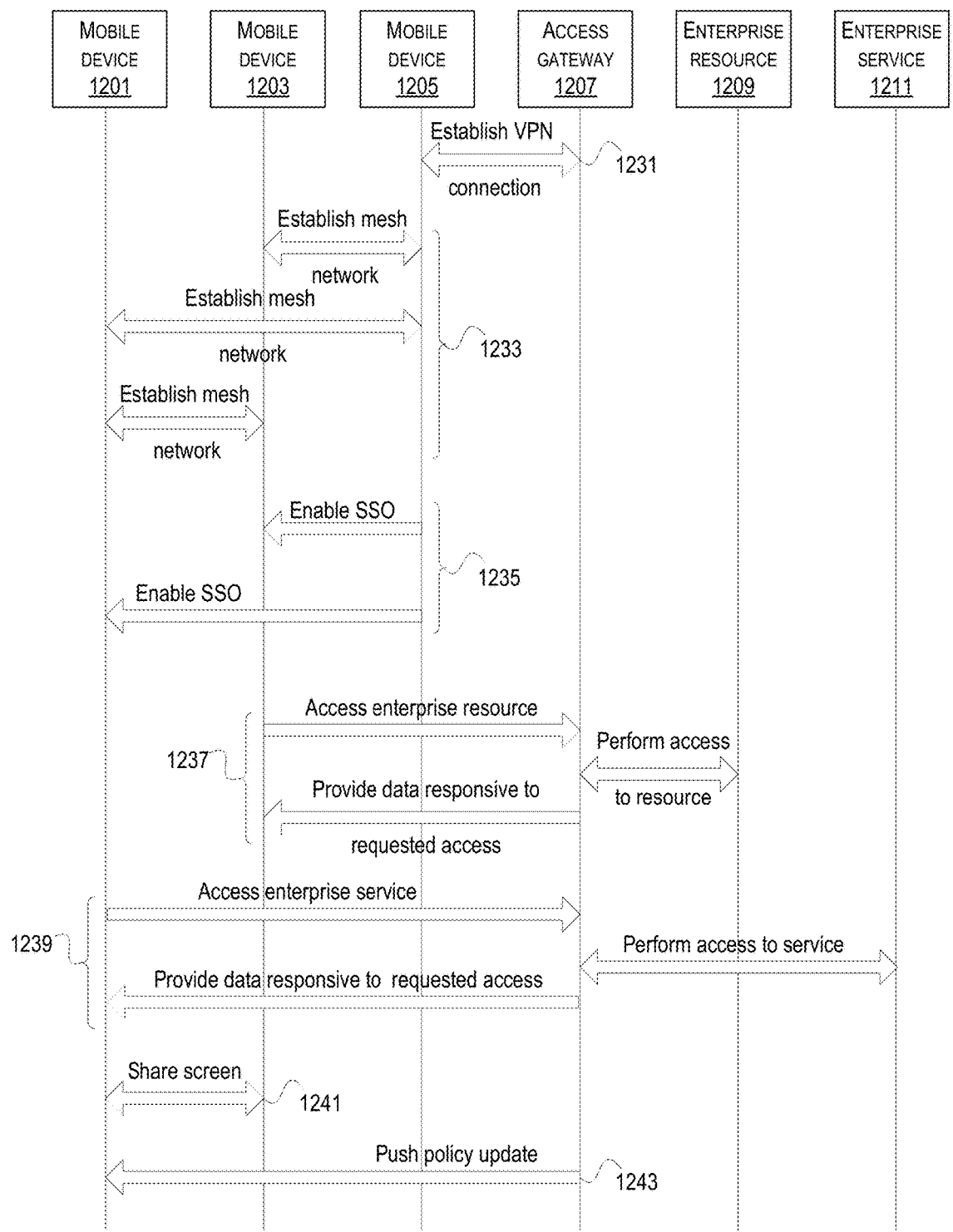
FIG. 12 illustrates an example flow depicting the establishment of a mesh network and use of the mesh network in connection with performing various functions associated with the enterprise mobility management system according aspects described herein.

FIG. 12 illustrates an example flow depicting the establishment of a mesh network and use of the mesh network in connection with performing various functions associated with the enterprise mobility management system according aspects described herein. In particular, the example flow illustrates a number of functions that can be performed in accordance with the arrangements and example methods described throughout this disclosure including FIGS. 7-11D.

As depicted in FIG. 12, three mobile devices are within a threshold distance from each other: mobile device 1201, 1203 and 1205. Each of the three mobile devices may be associated with the same user. The arrangement of devices shown in FIG. 12 is similar to the example arrangements of FIGS. 7 and 9; however, for simplicity, the various peer-to-peer connections and intervening networks have been omitted from FIG. 12. Through the various flows described in the example of FIG. 12, the mobile devices 1201, 1203 and 1205 may be able to establish a mesh network, communicate with members of the mesh network and communicate with an access gateway 1207 via a virtual private network connection established between the access gateway 1207 and one of the members of the mesh network. The various flows depicted in FIG. 12 may involve one or more communications between the various devices and may further include the performance of one or more of the example methods discussed at FIGS. 8, 10A, 10B and 11A-11D.

Beginning at flow 1231, mobile device 1205 and access gateway 1207 may establish a virtual private network connection between each other. Establishing the virtual private network connection may include the transmission of security credentials and other user information required by the access gateway to authenticate the mobile device 1205. The access gateway may further provide the mobile device 1205 with a valid authentication token configured for SSO. The arrow shown in connection with flow 1231 is meant to represent the various transmissions that may be exchanged between the mobile device 1205 and the access gateway 1207 in connection with establishing the virtual private network connection.

At flow 1233, the mobile devices 1201, 1203 and 1205 may establish a mesh network among each other. Establishing the mesh network may involve each device performing one of the example methods of FIG. 8 or 10A (or some variation thereof). For example, a user may initiate an attempt to establish a mesh network on device 1201. Device 1205 may be configured to display a PIN code that the user must input or confirm (e.g., at step 801 of FIG. 8) at devices 1201 and 1203. The PIN code may be used in connection with authorizing devices 1201 and 1203 as members of the mesh network. The arrows shown in connection with flow 1233 are meant to represent the various communications that would be transmitted among the mobile devices (e.g., using peer-to-peer communications and/or peer-to-peer connections).

At flow 1235, the mobile device 1205 may proceed to enable SSO for the other members in the mesh network. In some arrangements, this may include routing the valid authentication token configured for SSO to mobile device 1201 and 1203 over the mesh network. For example, mobile device 1205 may perform the example method of FIG. 11A so that the valid authentication token configured for SSO is transmitted via one or more peer-to-peer connections. Mobile device 1203 may perform the example method of FIG. 11B to receive the valid authentication token configured for SSO; process the valid authentication token configured for SSO for later use; and route the valid authentication token configured for SSO over the mesh network to a next hop, mobile device 1201. Mobile device 1201 may perform the example method of FIG. 11B to receive the valid authentication token configured for SSO and process it for later use. The arrows shown in connection with flow 1235 are meant to represent the various communications that would be transmitted over the mesh network so that both mobile device 1201 and 1203 receive the valid authentication token configured for SSO.

In some arrangements, based on flow 1235 that enables SSO for other members in the mesh network, secure containers on mobile device 1201 and 1203 may be unlocked for use based on the authentication token transmitted from mobile device 1205. For example, each of mobile devices 1201 and 1203 may include a secure container that normally is unlocked by inputting a password, PIN code or other security credential. Instead of requiring the user to input the password, PIN code, etc., the authentication token transmitted from mobile device 1205 may be used by mobile device 1201 and 1203 to unlock the secure container. In this way, mobile devices 1201 and 1203 may be enabled with SSO to their respective secure containers. The authentication token transmitted from mobile device 1205 may be used to enable SSO of various other components of the enterprise management framework including, for example, enabling SSO for a managed application.

At flow 1237, the mobile device 1203 may access enterprise resource 1209, which is controlled and/or managed by access gateway 1207. In some arrangements, this may include routing data indicating a request to access the enterprise resource 1209 over the mesh network so that mobile device 1205 is able to transmit the data via the virtual private network connection. For example, mobile device 1203 may perform the example method of FIG. 11A so that the data indicating a request to access the enterprise resource 1209 is transmitted via a peer-to-peer connection to the next hop, mobile device 1205. The data, in some arrangements, may include the valid authentication token configured for SSO (e.g., so that mobile device 1203 is able to perform a seamless authentication with the access gateway 1207 to access the enterprise resource 1209). Mobile device 1205 may perform the example method of FIG. 11C so that the data is received via a peer-to-peer connection and transmitted via the virtual private network connection to the access gateway 1207. Upon receipt, the access gateway 1207 may, based on the valid authentication token configured for SSO, authenticate the request and perform the requested access to enterprise resource 1209. The requested access may generate response data (e.g., a particular file that is being requested by the mobile device 1205) and the response data may be transmitted to mobile device 1205 via the virtual private network connection. Mobile device 1205 may perform the example method of FIG. 11D so that the response data is received via the virtual private network connection and routed over the mesh network to a next hop, mobile device 1203. Mobile device 1203 may perform the example method of FIG. 11B so that the response data is received and processed accordingly. The arrows shown in connection with flow 1237 are meant to represent the various communications that would be transmitted over the mesh network, via the virtual private network connection, and between the access gateway 1207 and the enterprise resource 1209, so that mobile device 1203 can successfully access the enterprise resource 1209.

At flow 1239, mobile device 1201 may access an enterprise service 1211, which is controlled and/or managed by access gateway 1207. In some arrangements, this may include routing data indicating a request to access the enterprise service 1211 over the mesh network so that mobile device 1205 is able to transmit the data via the virtual private network connection. For example, mobile device 1201 may perform the example method of FIG. 11A so that the data indicating a request to access the enterprise service 1211 is transmitted via a peer-to-peer connection to the next hop, mobile device 1203. The data, in some arrangements, may include the valid authentication token configured for SSO (e.g., so that mobile device 1201 is able to perform a seamless authentication with the access gateway to access the enterprise service 1211). Mobile device 1203 may perform the example method of FIG. 11B so that the data is received via a peer-to-peer connection and transmitted over the mesh network to the next hop, mobile device 1205. Mobile device 1205 may perform the example method of FIG. 11C so that the data is received via a peer-to-peer connection and transmitted via the virtual private network connection to the access gateway 1207. Upon receipt, the access gateway 1207 may, based on the valid authentication token configured for SSO, authenticate the request and perform the requested access to enterprise service 1211. The requested access may generate response data (e.g., a listing of files being shared by a file sharing service) and the response data may be transmitted to mobile device 1205 via the virtual private network connection. Mobile device 1205 may perform the example method of FIG. 11D so that the response data is received via the virtual private network connection and routed over the mesh network to a next hop, mobile device 1203. Mobile device 1203 may perform the example method of FIG. 11B so that the response data is received via a peer-to-peer connection and routed over the mesh network to a next hop, mobile device 1201. Mobile device 1201 may perform the example method of FIG. 11B so that the response data is received and processed accordingly. The arrows shown in connection with flow 1239 are meant to represent the various communications that would be transmitted over the mesh network, via the virtual private network connection, and between the access gateway 1207 and the enterprise service 1211, so that mobile device 1201 can successfully access the enterprise service 1211.

At flow 1241, mobile device 1203 may share its screen with mobile device 1201. In some arrangements, this may include preparing graphical data for the screen of mobile device 1203 and routing the graphical data over the mesh network so that mobile device 1201 is able to display the graphical data. For example, mobile device 1203 may perform the example method of FIG. 11A to prepare the graphical data and route the graphical data to a next hop, mobile device 1201. Mobile device 1201 may perform the example method of FIG. 11B to receive and process the graphical data accordingly. In some arrangements, a user of mobile device 1201 may be able to interact with the graphical data (e.g., highlight portions of a text document shown via the shared screen, perform a copy action with a document, perform a paste action with a document, etc.). In such arrangements, mobile device 1201 may perform the example method of FIG. 11A to prepare data indicating one or more user interactions and route the data over the mesh network to a next hop, mobile device 1203. Mobile device 1203 may perform the example method of FIG. 11B to receive the data indicating the one or more user interactions and process it accordingly (e g, manipulate the screen based on the one or more user interactions). The arrows shown in connection with flow 1241 are meant to represent the various communications that would be transmitted over the mesh network, via the virtual private network connection, and between the access gateway 1207 and the enterprise service 1211, so that mobile device 1201 can successfully access the enterprise service 1211.

At flow 1243, the access gateway 1207 may push a policy update to one or more members of the mesh network. Each of the mobile devices 1201, 1203 and 1205 may store a policy that is enforced by an application management framework of the respective mobile device. As shown in FIG. 12, the policy update is pushed to all members of the mesh network. In some arrangements, pushing a policy update may include the access gateway 1207 determining an updated policy and transmitting the updated policy to mobile device 1205 via the virtual private network connection. Mobile device 1205 may perform the example method of FIG. 11D so that the updated policy is received via the virtual private network connection; processed to update a policy stored by the mobile device 1205; and routed over the mesh network to a next hop, mobile device 1203. Mobile device 1203 may perform the example method of FIG. 11B so that the updated policy is received via a peer-to-peer connection; processed to update a policy stored by the mobile device 1203; and routed to a next hop, mobile device 1201. Mobile device 1201 may perform the example method of FIG. 11B so that the updated policy is received and processed to update a policy stored by the mobile device 1201. The arrows shown in connection with flow 1243 are meant to represent the various communications that would be transmitted over the mesh network and via the virtual private network connection, so that the access gateway 1207 can successfully push an updated policy to each member of the mesh network.

The above flows described in connection with FIG. 12 provide only a few examples of the types of functions that can be performed using the arrangements described herein or variations thereof. For example, in addition to enabling SSO and/or sharing a screen between devices, mobile devices 1201, 1203 and 1205 may communicate over the mesh network to transmit chat messages among members of the mesh network, copy a file to and from members of the mesh network, share files or other data among members of the mesh network, and the like. As another example, in addition to accessing enterprise resources 1209 or 12011, mobile devices 1201, 1203 and 1205 may communicate over the mesh network and with the access gateway 1207 to access the Internet in connection with a managed browsing application.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
configuring a first mobile device as a member of a mesh network, wherein after the configuring, the first mobile device is able to communicate with a second mobile device via the mesh network over a peer-to-peer connection;
sending, by the first mobile device and to the second mobile device, via the mesh network over the peer-to-peer connection, a valid authentication token that is configured for single sign-on (SSO) and that is configured to unlock a secure container of the second mobile device and enable the SSO for the secure container;
receiving, by the first mobile device, via the mesh network over the peer-to-peer connection, first data that is intended for an access gateway, wherein the access gateway is in communication with the first mobile device via a second network different from the mesh network; and
sending, by the first mobile device, via the second network over a virtual private network connection between the first mobile device and the access gateway, the first data to the access gateway.

2. The method of claim 1, further comprising:
receiving, by the first mobile device, via the second network over the virtual private network connection, second data that is intended for the second mobile device;
decrypting, based on a decryption key associated with the virtual private network connection, the second data, resulting in decrypted second data;
encrypting, based on an encryption key associated with the peer-to-peer connection, the decrypted second data, resulting in encrypted second data; and
sending, by the first mobile device, via the mesh network over the peer-to-peer connection, the encrypted second data to the second mobile device.

3. The method of claim 2, wherein the second data comprises an update to a policy enforced by an application management framework of the second mobile device.

4. The method of claim 1, wherein the first data comprises the valid authentication token, and wherein the valid authentication token enables the access gateway to authenticate, based on the SSO, the second mobile device.

5. The method of claim 1, wherein the second network comprises a wireless network, and wherein the method further comprises:
connecting, by the first mobile device, to the wireless network, wherein the virtual private network connection is configured as a tunnel through the wireless network, and wherein the second mobile device is not connected to the wireless network.

6. The method of claim 1, wherein the access gateway is configured to manage access to an enterprise resource, and wherein the method further comprises:
receiving, by the first mobile device, via the mesh network over the peer-to-peer connection, second data that is intended for the access gateway and that indicates, for a third mobile device, a request to access the enterprise resource, wherein the mesh network comprises the first mobile device, the second mobile device and the third mobile device;

sending, by the first mobile device, via the second network over the virtual private network connection, the second data to the access gateway;

receiving, by the first mobile device, via the second network over the virtual private network connection, response data that is based on the request to access the enterprise resource; and causing, by the first mobile device, the response data to be routed via the mesh network such that the third mobile device receives the response data.

7. The method of claim 1, further comprising:

receiving, by the first mobile device, via the mesh network over the peer-to-peer connection, second data that is intended for a third mobile device, wherein the mesh network comprises the first mobile device, the second mobile device and the third mobile device; and causing, by the first mobile device, the second data to be routed via the mesh network such that the third mobile device receives the second data in an encrypted form.

8. The method of claim 1, wherein the peer-to-peer connection comprises a BLUETOOTH connection or a WI-FI DIRECT connection.

9. The method of claim 1, further comprising:

receiving, by the second mobile device and from the first mobile device, via the mesh network over the peer-to-peer connection, the valid authentication token; and based on the valid authentication token, unlocking, by the second mobile device, the secure container to enable the SSO for the secure container, wherein the secure container is associated with an enterprise management framework.

10. An apparatus comprising:

one or more processors; and memory storing executable instructions that, when executed by the one or more processors, causes the apparatus to:

configure the apparatus as a member of a mesh network, wherein after being configured, the apparatus is able to communicate with a first mobile device via the mesh network over a peer-to-peer connection;

send, to the first mobile device, via the mesh network over the peer-to-peer connection, a valid authentication token that is configured for single sign-on (SSO) and that is configured to unlock a secure container of the first mobile device and enable the SSO for the secure container;

receive, via the mesh network over the peer-to-peer connection, first data that is intended for an access gateway, wherein the access gateway is in communication with the apparatus via a second network different from the mesh network; and send, via the second network over a virtual private network connection between the first mobile device and the access gateway, the first data to the access gateway.

11. The apparatus of claim 10, wherein the executable instructions, when executed by the one or more processors, cause the apparatus to:

receive, via the second network over the virtual private network connection, second data that is intended for the first mobile device;

decrypt, based on a decryption key associated with the virtual private network connection, the second data, resulting in decrypted second data;

encrypt, based on an encryption key associated with the peer-to-peer connection, the decrypted second data, resulting in encrypted second data; and transmit, via the mesh network over the peer-to-peer connection, the second data to the first mobile device.

12. The apparatus of claim 11, wherein the second data comprises an update to a policy enforced by an application management framework of the first mobile device.

13. The apparatus of claim 10, wherein the first data comprises the valid authentication token, and wherein the valid authentication token enables the access gateway to authenticate, based on the SSO, the first mobile device.

14. The apparatus of claim 10, wherein the second network comprises a wireless network, and wherein the executable instructions, when executed by the one or more processors, cause the apparatus to:

connect to the wireless network, wherein the virtual private network connection is configured as a tunnel through the wireless network, and wherein the first mobile device is not connected to the wireless network.

15. The apparatus of claim 10, wherein the access gateway is configured to manage access to an enterprise resource, and wherein the executable instructions, when executed by the one or more processors, cause the apparatus to:

receive, via the mesh network over the peer-to-peer connection, second data that is intended for the access gateway and that indicates, for a second mobile device, a request to access the enterprise resource, wherein the mesh network comprises the apparatus, the first mobile device and the second mobile device;

send, via the second network over the virtual private network connection, the second data to the access gateway;

receive, via the second network over the virtual private network connection, response data that is based on the request to access the enterprise resource; and cause the response data to be routed via the mesh network such that the second mobile device receives the response data.

16. One or more computer-readable media storing executable instructions that, when executed, causes an apparatus to:

configure the apparatus as a member of a mesh network, wherein after being configured, the apparatus is able to communicate with a first mobile device via the mesh network over a peer-to-peer connection;

send, to the first mobile device, via the mesh network over the peer-to-peer connection, a valid authentication token that is configured for single sign-on (SSO) and that is configured to unlock a secure container of the first mobile device and enable the SSO for the secure container;

receive, via the mesh network over the peer-to-peer connection, first data that is intended for an access gateway, wherein the access gateway is in communication with the apparatus via a second network different from the mesh network; and send, via the second network over a virtual private network connection between the apparatus and the access gateway, the first data to the access gateway.

17. The one or more computer-readable media of claim 16, wherein the executable instructions, when executed, cause the apparatus to:

receive, via the second network over the virtual private network connection, second data that is intended for the first mobile device;

decrypt, based on a decryption key associated with the virtual private network connection, the second data, resulting in decrypted second data;

encrypt, based on an encryption key associated with the peer-to-peer connection, the decrypted second data, resulting in encrypted second data; and send, via the mesh network over the peer-to-peer connection, the encrypted second data to the first mobile device.

18. The one or more computer-readable media of claim 17, wherein the second data comprises an update to a policy enforced by an application management framework of the first mobile device.

19. The one or more computer-readable media of claim 16, wherein the second network comprises a wireless network, and wherein the executable instructions, when executed, cause the apparatus to:

connect to the wireless network, wherein the virtual private network connection is configured as a tunnel through the wireless network, and wherein the first mobile device is not connected to the wireless network.

20. The one or more computer-readable media of claim 16, wherein the access gateway is configured to manage access to an enterprise resource, and wherein the executable instructions, when executed, cause the apparatus to:

receive, via mesh network over the peer-to-peer connection, second data that is intended for the access gateway and that indicates, for a second mobile device, a request to access the enterprise resource, wherein the mesh network comprises the apparatus, the first mobile device and the second mobile device;

transmit, via the second network over the virtual private network connection, the second data to the access gateway;

receive, via the second network over the virtual private network connection, response data that is based on the request to access the enterprise resource; and cause the response data to be routed via the mesh network such that the second mobile device receives the response data.

* * * * *